(12) United States Patent
Stone, Jr.

(10) Patent No.: US 8,812,339 B1
(45) Date of Patent: Aug. 19, 2014

(54) SYSTEM AND METHOD FOR SCHEDULING TASKS

(76) Inventor: Jack D. Stone, Jr., Dallas, TX (US)

( * ) Notice: Subject to any disclaimer, the term of this patent is extended or adjusted under 35 U.S.C. 154(b) by 857 days.

(21) Appl. No.: 12/549,336

(22) Filed: Aug. 27, 2009

Related U.S. Application Data

(63) Continuation-in-part of application No. 11/137,094, filed on May 24, 2005, now abandoned, and a continuation-in-part of application No. 10/772,652, filed on Feb. 4, 2004, now abandoned, which is a continuation-in-part of application No. 10/205,261, filed on Jul. 24, 2002, now abandoned.

(60) Provisional application No. 60/574,185, filed on May 25, 2004.

(51) Int. Cl.
*G06Q 10/00* (2012.01)
*G06Q 10/06* (2012.01)

(52) U.S. Cl.
CPC ........ *G06Q 10/06316* (2013.01); *G06Q 10/063* (2013.01); *G06Q 10/06313* (2013.01); *G06Q 10/0637* (2013.01); *G06Q 10/06314* (2013.01)
USPC ....... 705/7.26; 705/7.11; 705/7.23; 705/7.36; 705/7.24

(58) Field of Classification Search
CPC .............................................. G06Q 10/06316
See application file for complete search history.

(56) References Cited

U.S. PATENT DOCUMENTS

| | | | |
|---|---|---|---|
| 4,896,269 A | 1/1990 | Tong | |
| 5,291,397 A | 3/1994 | Powell | |
| 5,408,663 A | 4/1995 | Miller | |
| 5,436,965 A * | 7/1995 | Grossman et al. | 379/266.08 |
| 5,524,077 A | 6/1996 | Faaland et al. | |
| 5,671,361 A | 9/1997 | Brown et al. | |
| 5,890,134 A | 3/1999 | Fox | |
| 5,907,490 A * | 5/1999 | Oliver | 700/90 |
| 5,907,829 A | 5/1999 | Kida | |
| 6,098,052 A * | 8/2000 | Kosiba et al. | 705/40 |
| 6,256,651 B1 | 7/2001 | Tuli | |
| 6,571,215 B1 | 5/2003 | Mahapatro | |
| 6,714,829 B1 * | 3/2004 | Wong | 700/101 |
| RE38,633 E | 10/2004 | Srinivasan | |
| 6,947,987 B2 | 9/2005 | Boland | |

(Continued)

OTHER PUBLICATIONS

Adam, Nabil R. et al., "Priority Update Intervals and Anomalies in Dynamic Ratio Type Job Shop Scheduling Rules," Management Science, Dec. 1980, vol. 26, No. 12. pp. 1227-1237.

(Continued)

*Primary Examiner* — Brett Feeney
(74) *Attorney, Agent, or Firm* — Jack D. Stone, Jr.

(57) ABSTRACT

Non-pending tasks having no pending due dates (e.g., past due tasks) are scheduled with pending tasks having pending due dates by first generating a hypothetical schedule and then an actual schedule. The hypothetical schedule is generated by distributing hours to complete pending tasks as evenly as possible over as many days as possible up to respective due dates; then scheduling non-pending tasks during hours normally available for work and which are not distributed to pending tasks; and then recording as quasi due dates for respective non-pending tasks the dates that the respective non-pending tasks would be completed on the hypothetical schedule. The actual schedule is then generated by scheduling non-pending tasks with pending tasks in chronological order, according to pending due dates for pending tasks, and quasi due dates for non-pending tasks.

18 Claims, 29 Drawing Sheets

(56) References Cited

U.S. PATENT DOCUMENTS

| | | |
|---|---|---|
| 7,062,449 B1 | 6/2006 | Clark |
| 7,069,229 B1* | 6/2006 | Richardson et al. ......... 705/7.15 |
| 7,076,727 B1* | 7/2006 | Flam et al. .................... 715/202 |
| 7,139,720 B1* | 11/2006 | Foell et al. .................... 705/7.22 |
| 7,171,375 B2* | 1/2007 | Clarke .......................... 705/7.14 |
| 7,725,339 B1* | 5/2010 | Aykin ........................... 705/7.14 |
| 7,774,225 B2* | 8/2010 | Cargille et al. .............. 705/7.25 |
| 2001/0049619 A1* | 12/2001 | Powell et al. ..................... 705/9 |
| 2002/0029161 A1* | 3/2002 | Brodersen et al. ................ 705/9 |
| 2002/0040313 A1* | 4/2002 | Hunter et al. ..................... 705/9 |
| 2002/0065700 A1* | 5/2002 | Powell et al. ..................... 705/9 |
| 2003/0065415 A1* | 4/2003 | Hegde et al. .................. 700/100 |
| 2003/0220806 A1* | 11/2003 | Hoffman et al. .................. 705/1 |
| 2005/0086179 A1* | 4/2005 | Mehmet .......................... 705/80 |
| 2005/0240578 A1* | 10/2005 | Biederman et al. ............... 707/3 |
| 2005/0288950 A1* | 12/2005 | Mager ............................... 705/1 |
| 2006/0020366 A1* | 1/2006 | Bloom .......................... 700/226 |
| 2006/0200774 A1* | 9/2006 | Flam et al. .................... 715/764 |
| 2008/0052146 A1* | 2/2008 | Messinger et al. ................ 705/9 |
| 2009/0132318 A1* | 5/2009 | Jin et al. ........................... 705/7 |

OTHER PUBLICATIONS

Baker, Kenneth R., "Sequencing Rules and Due-Date Assignments in a Job Shop," Management Science, Sep. 1984, vol. 30, No. 9. pp. 1093-1104.

Gere Jr., William S., "Heuristics in Job Shop Scheduling," Management Science, Nov. 1966, vol. 13, No. 3. pp. 167-190.

Hwang, Shyh-In et al., "Scheduling an Overloaded Real-Time System," IEEE [0-7803-3255-5/96], May 1996, pp. 22-28.

* cited by examiner

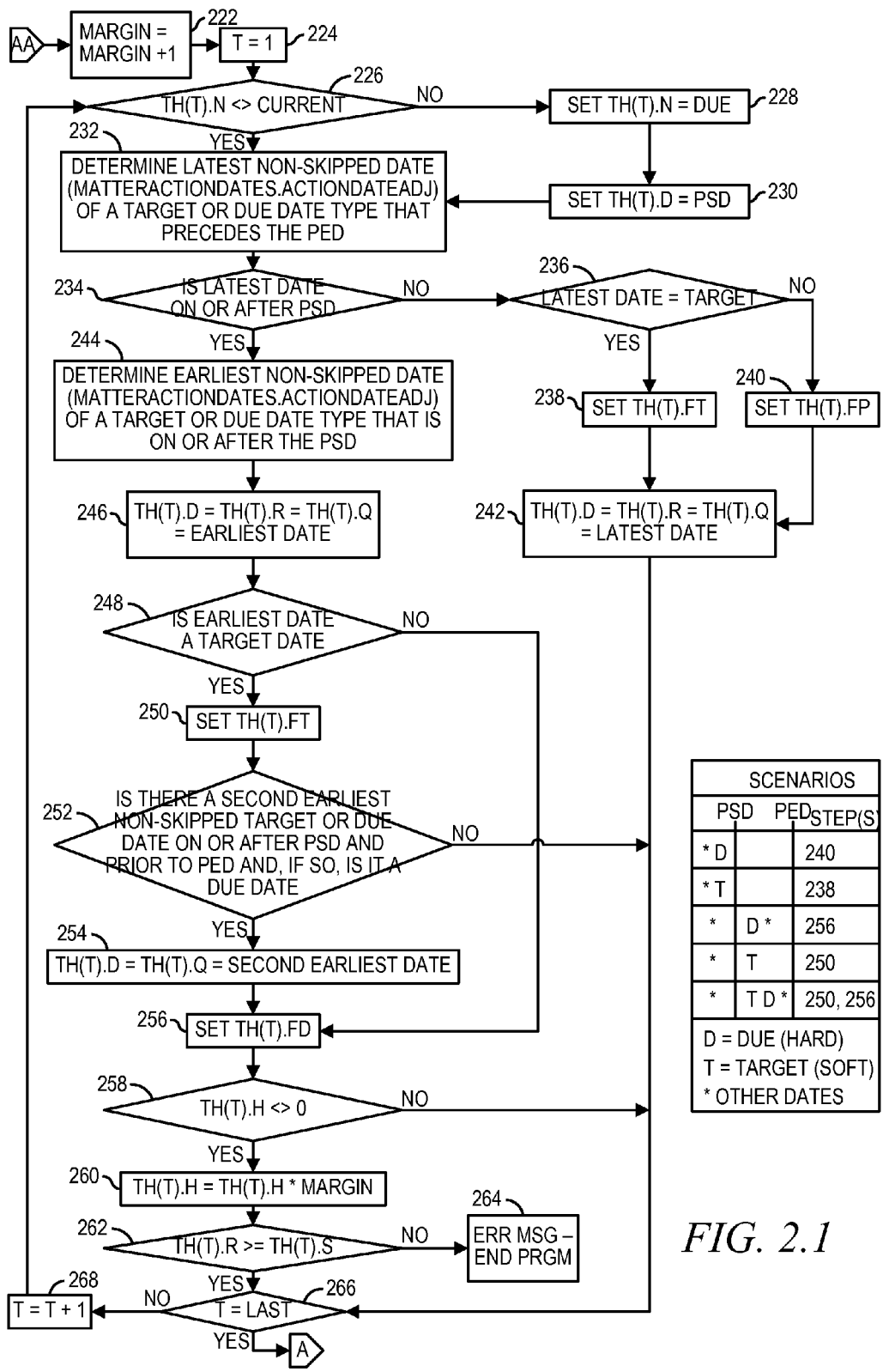
FIG. 2.1

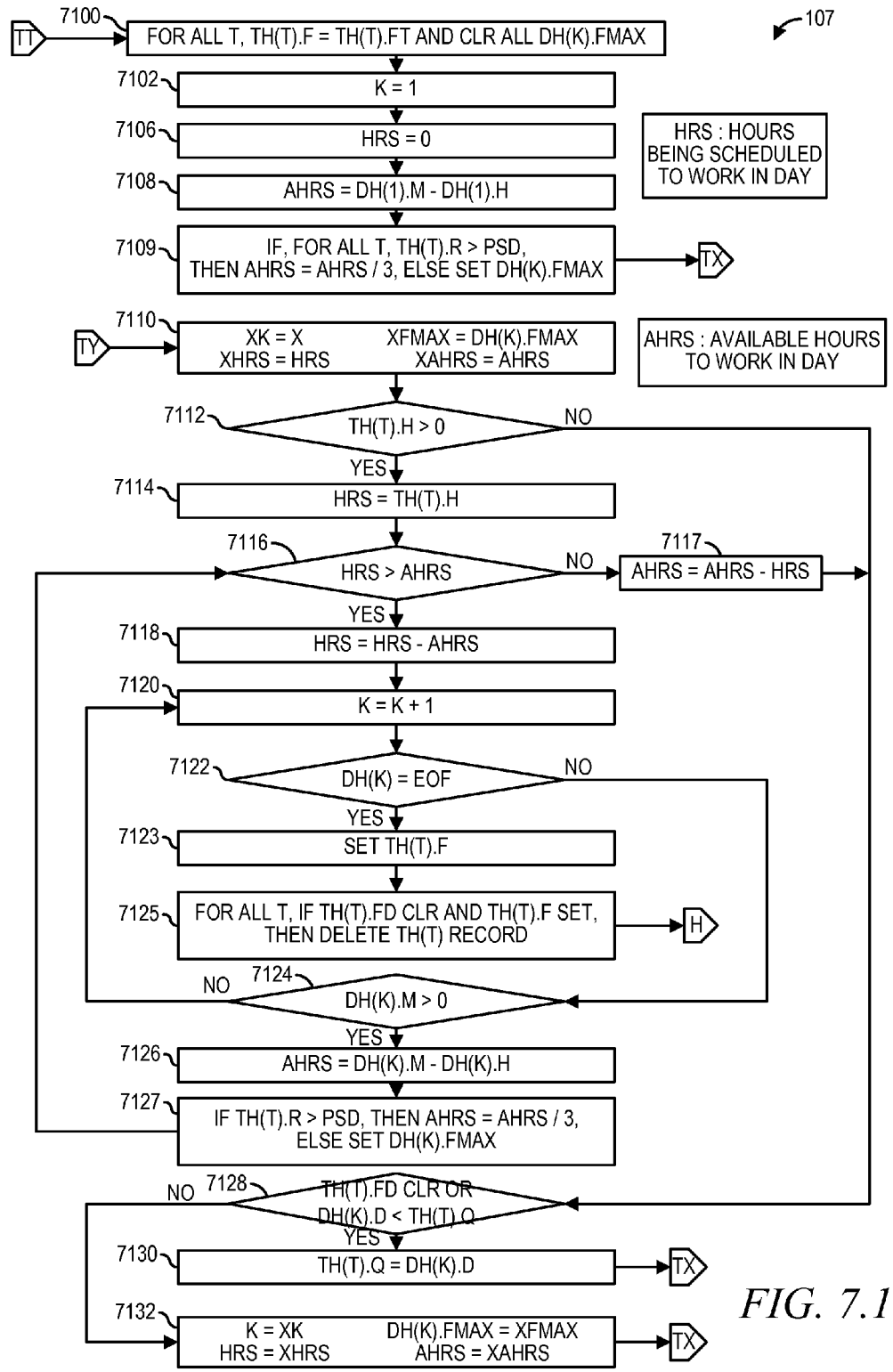
FIG. 7.1

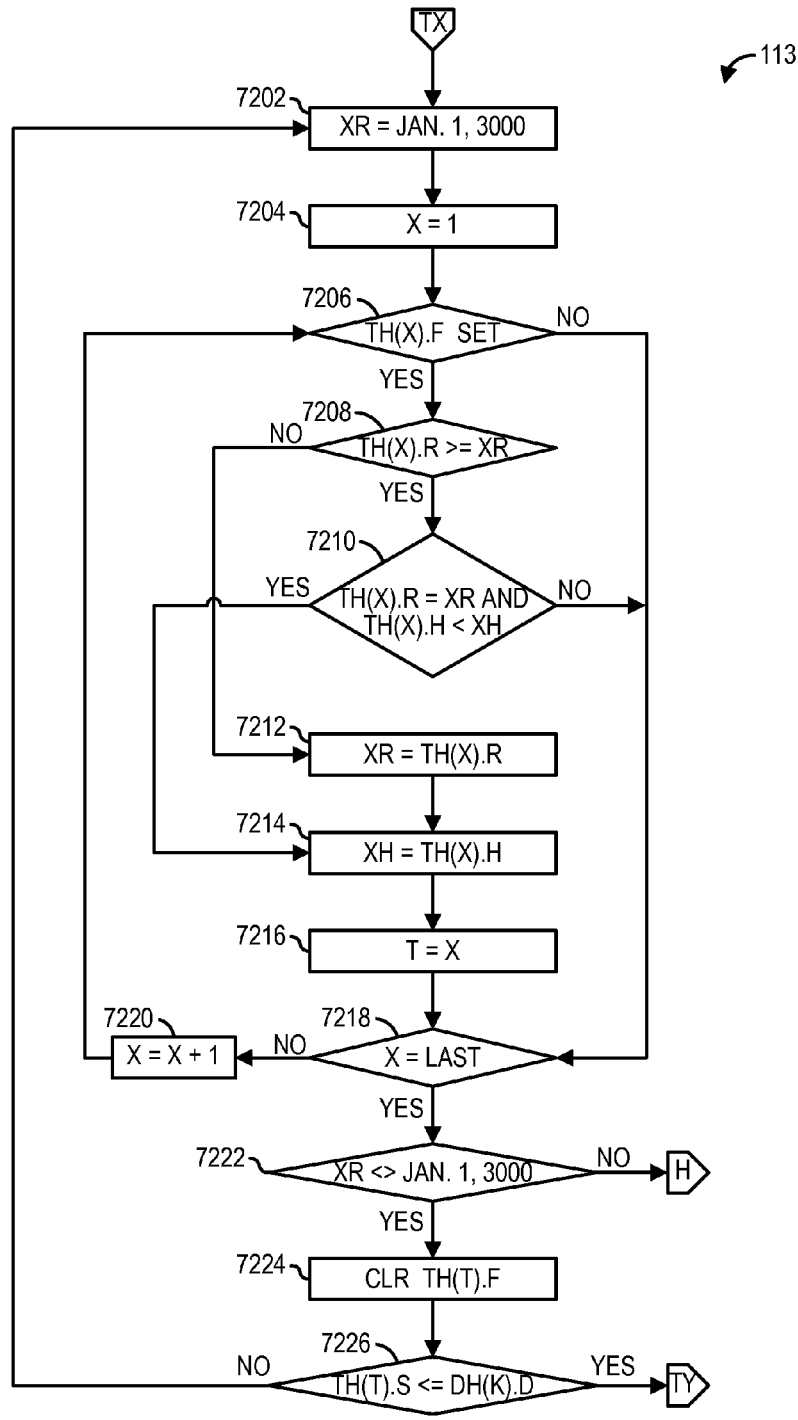
FIG. 7.2

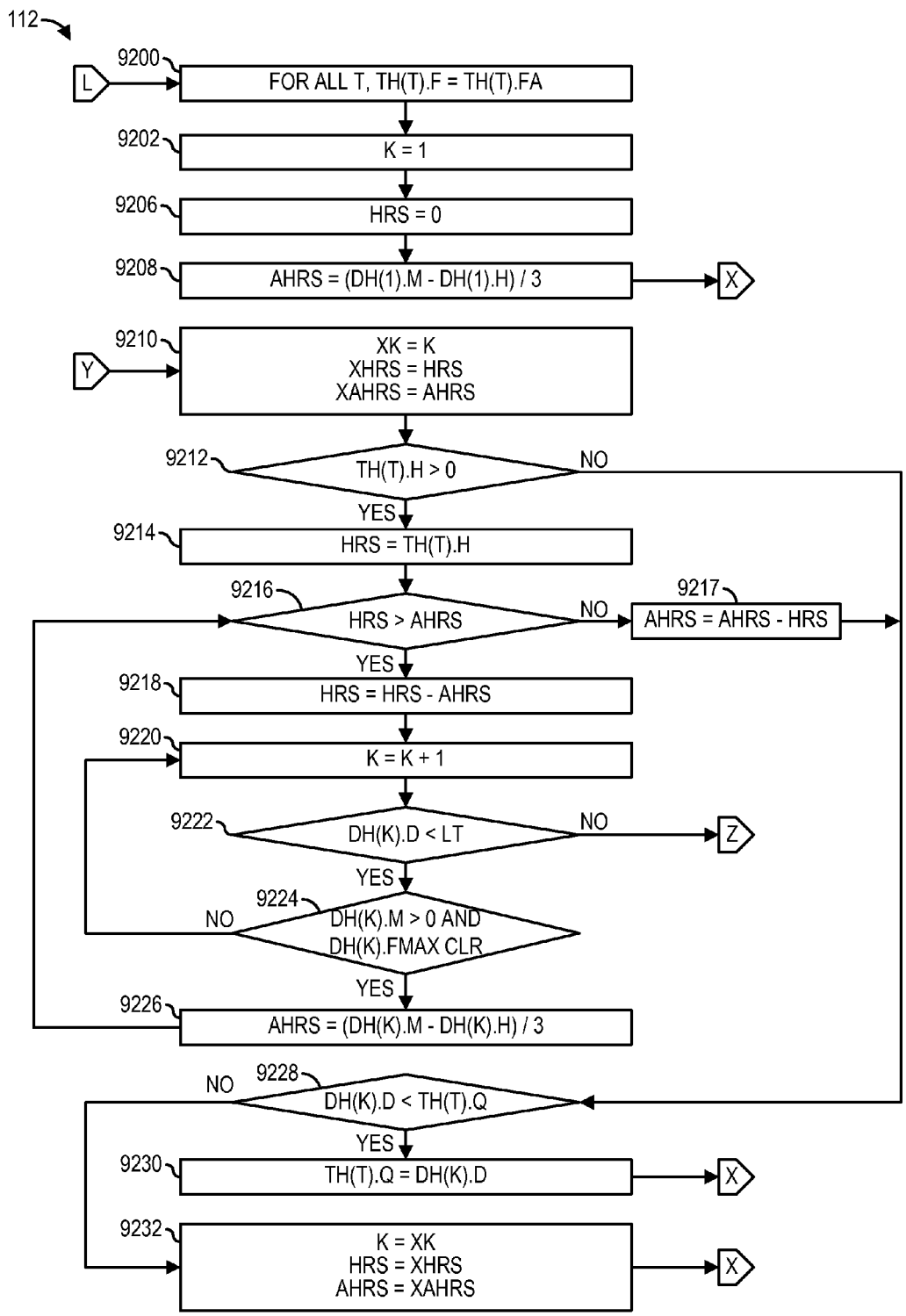
FIG. 9.2

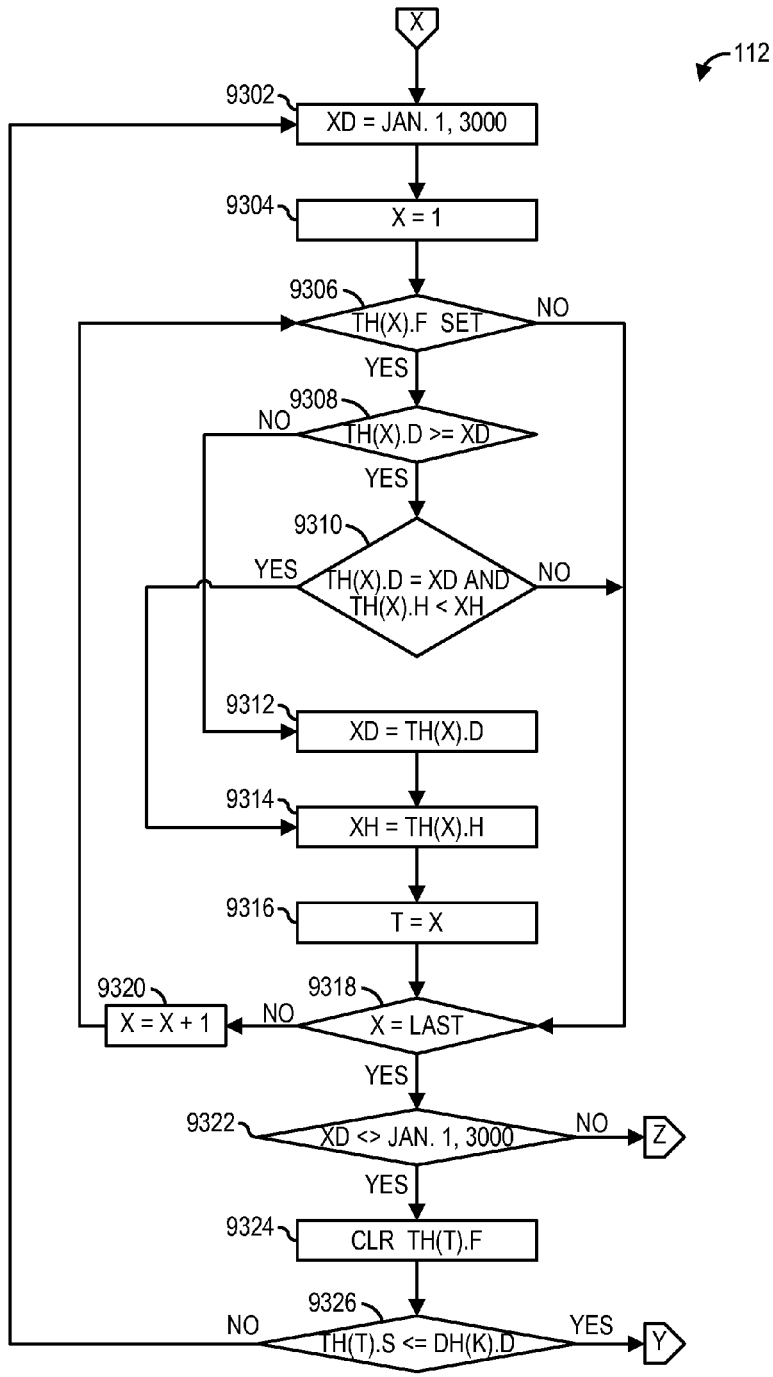
FIG. 9.3

SYSTEM AND METHOD FOR SCHEDULING TASKS

CROSS-REFERENCES TO RELATED APPLICATIONS

This application is a continuation-in-part of co-pending patent application Ser. No. 11/137,094, filed on May 24, 2005, which claims the benefit of U.S. Provisional Application No. 60/574,185, filed May 25, 2004, which patent application is a continuation-in-part of co-pending patent application Ser. No. 10/772,652, filed on Feb. 4, 2004, which application is a continuation-in-part of co-pending patent application Ser. No. 10/205,261, filed on Jul. 24, 2002, all of which aforementioned applications are hereby incorporated herein by reference, in their entirety.

TECHNICAL FIELD

The invention relates generally to data processing systems and methods for planning tasks and, more particularly, to data processing system and methods for scheduling priority tasks and past due tasks with pending deadline tasks.

BACKGROUND

There are a number of task and time management tools available to assist in tracking work to be completed according particular due dates. Commonly, such tools, such as Microsoft Outlook™ provide for the entry of tasks to be done, and due dates, start dates, and estimates hours required to complete the task by the due date. However, such tools do not analyze the hours, or determine the number of hours that must be worked per day, to meet deadlines or to determine whether or not deadlines may be met, and/or whether and how much overtime must be worked to meet pending deadlines, as well as to also schedule past due tasks. As a result, people often over-commit themselves to more than they can complete. Managers have difficulty determining who they can give new work to because it is difficult to determine who has the most open schedule for new work. Clients may want to know when a new job can be completed by, but often such requests take substantial time to respond to because workloads among a number of different people must be ascertained. Vacations may be difficult to plan without spending substantial time reviewing all work that must be completed before a vacation can be taken. Such tools also do not permit one to gain a sense of how flexible a schedule may be.

Additionally, tasks often need to be scheduled based on priority rather than, or in addition to, a date deadline. Current systems do not allow for such scheduling.

Therefore, what is needed is a method and system for analyzing hours and determining hours that must be worked per day, given particular past and pending due dates and, if appropriate, start dates, to assist people in better managing, organizing, and planning their time.

BRIEF DESCRIPTION OF THE DRAWINGS

For a more complete understanding of the present invention, and the advantages thereof, reference is now made to the following descriptions taken in conjunction with the accompanying drawings, in which.

SUMMARY

A method for managing time to complete two or more pending, priority, and/or past due tasks, each of which tasks requires a respective estimated quantity of time to be completed by a respective pending or past due date. In one preferred embodiment, the time, including overtime, that must be worked per day until the due date of each respective task is calculated such that the deviation in the time per day that must be worked from one day to the next day until the last due date is substantially minimized.

In another preferred embodiment, "quasi" due dates are calculated for past due and priority tasks so that both past due and priority tasks may be scheduled during hours available but not needed to meet deadlines with pending tasks. In another preferred embodiment, tasks are deferred as much as possible to determine how quickly new "emergency" tasks may be completed. At least one report may be generated indicating how much time should be worked per day on two or more tasks.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning databases, program logic, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a microcontroller, an application-specific integrated circuit (ASIC), an electronic data processor, a computer, a personal digital assistant (PDA), or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

It is further noted, that unless indicated otherwise, tasks may have multiple due dates, each of which may carry a different priority, and the term "due date" will be used herein to refer to due dates, past due dates, final dates, and the like, all of which may be assigned to the same task.

Figure 18:
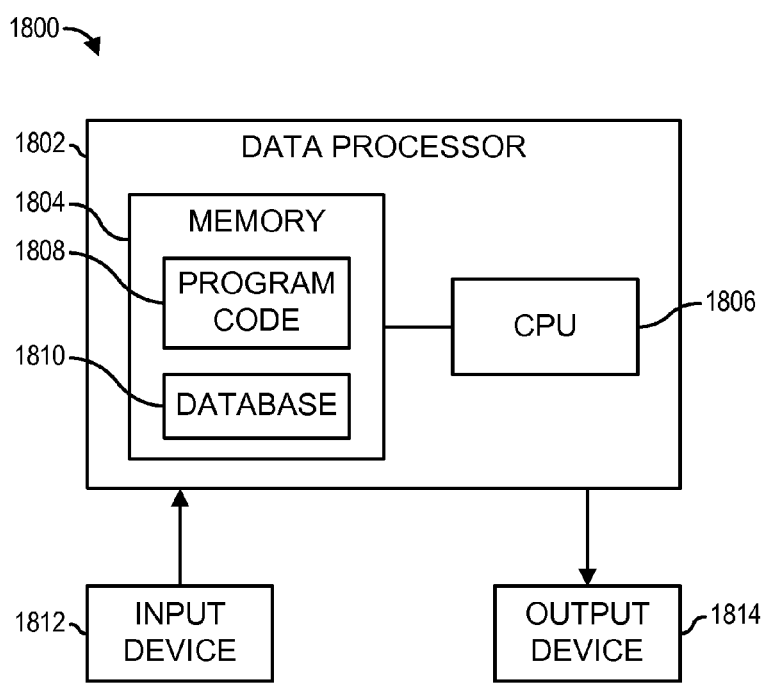
FIG. 18 depicts a data processing system that may be used to implement features of the present invention.

Referring first to FIG. 18 of the drawings, the reference numeral 1800 generally designates a data processing system that may be used to implement the present invention. The system 1800 includes a data processor 1802 comprising a memory 1804 and a central processor unit (CPU) 1806. The memory 1804 comprises portions of memory (e.g., RAM, hard disk, and the like) allocated for storing program code 1808 executable by the CPU 1806, and a database 1810. The system 1800 further comprises an input device (e.g., a keyboard, mouse, and the like) and an output device (e.g., a monitor, printer, and the like).

Figure 19:
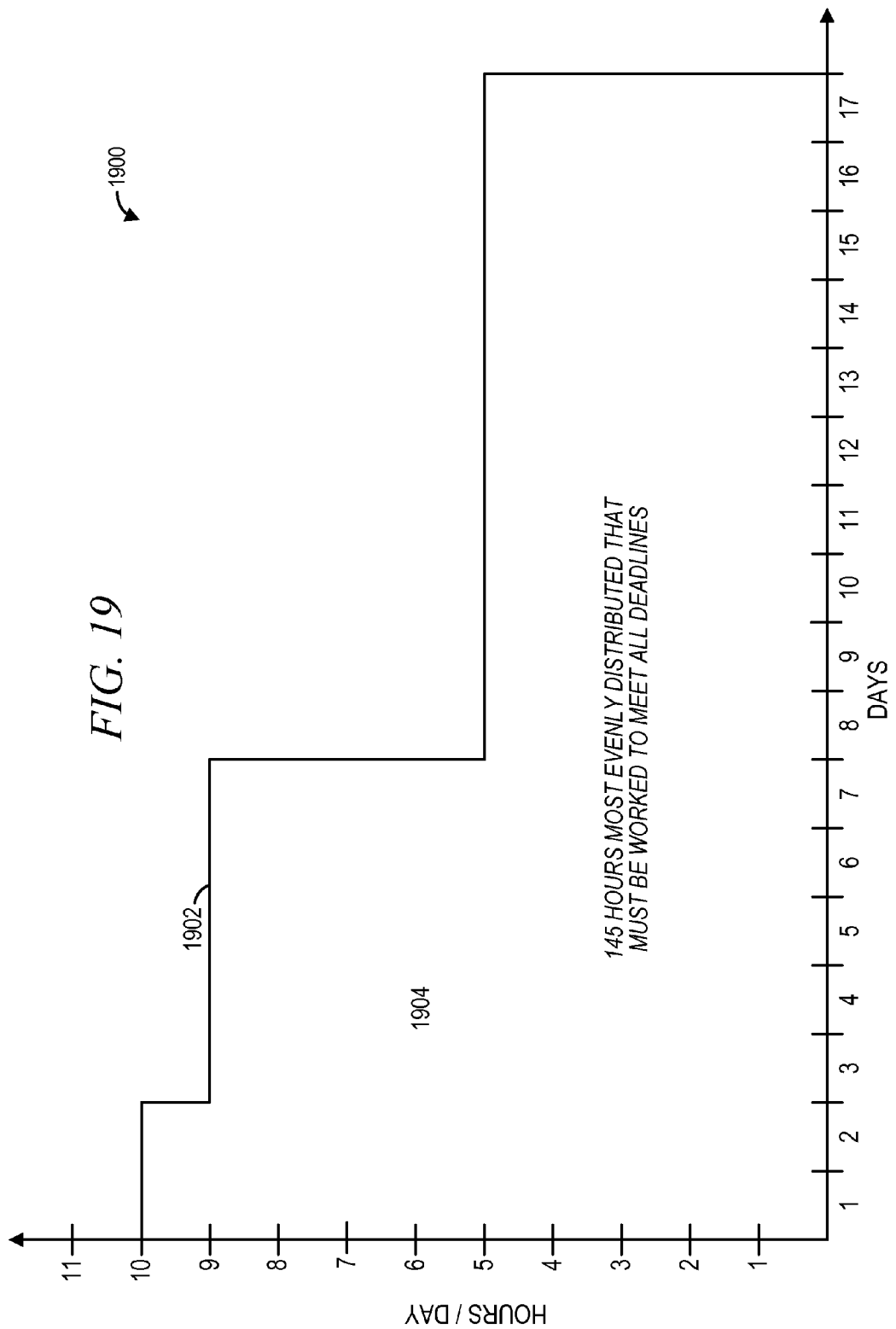
FIG. 19 depicts how hours for various tasks of a hypothetical set of tasks that need to be scheduled by distributing the hours for each task as substantially evenly as possible.

FIG. 19 exemplifies a hypothetical case wherein days are shown on a horizontal scale and hours per day are shown on a vertical scale. There are at least three tasks involved requiring 145 hours of work, 20 hours of which have at least one deadline at the end of Day 2, and 45 hours of which have a second deadline at the end of Day 7. An additional 50 hours need to be completed by the end of Day 17. It is understood, though, that there may be any number of tasks and deadlines that could result in the number of hours shown in FIG. 19, and that the hours required may also vary with the tasks and deadlines.

Figure 20:
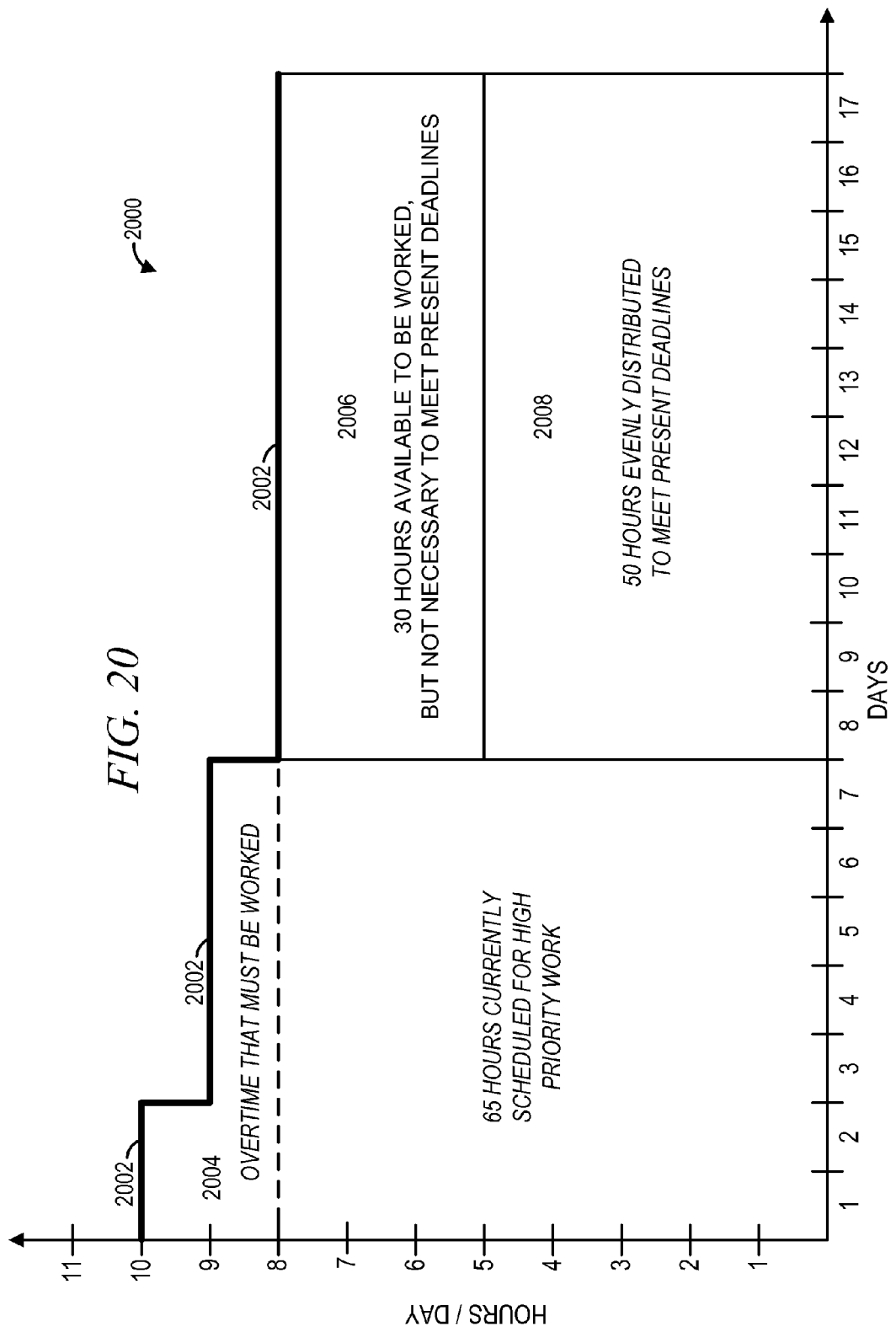
FIG. 20 depicts how hours for the hypothetical set of FIG. 19 compare to a preferred regular number of hours to work.

FIG. 20 adds a number of hours/day (H/D) that a person would prefer to work, exemplified as 8 H/D. The line 2002 indicates H/D that must be worked to meet all deadlines. As apparent in FIG. 20, during Days 1-7, the person must work OT to meet deadlines. More specifically, the person must work 65 hours during Days 1-7, apportioned as 2 H/D of OT during Days 1 and 2, and 1 H/D of OT during Days 3-7. During Days 8-17, however, only 50 hours need to be worked to complete tasks, leaving 30 hours (given 8 H/D), or 3 extra H/D, that do not need to be worked, and deadlines may still be met. If the person should work 8 H/D, though, he would complete his/her tasks ahead of the deadlines.

Figure 21:
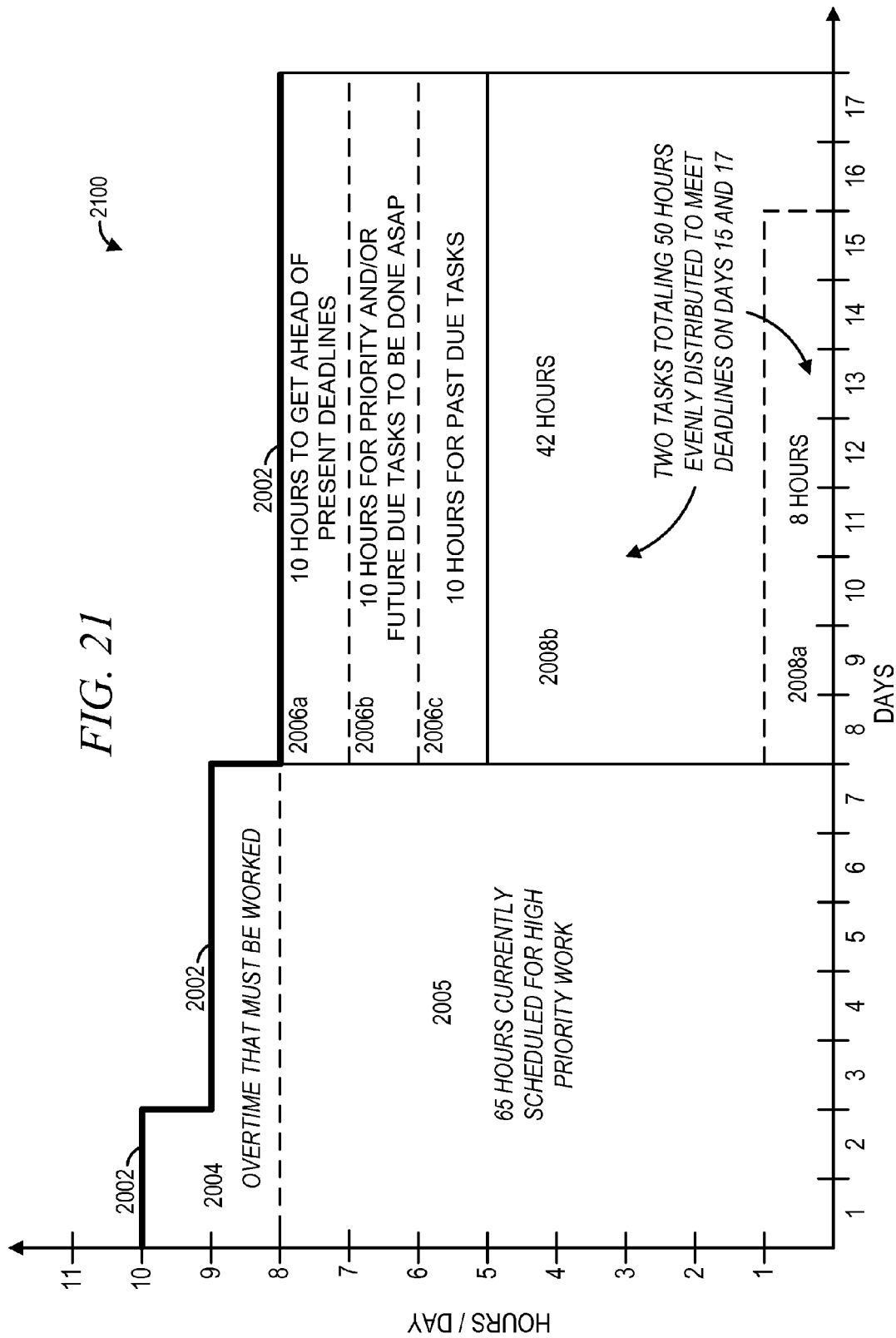
FIG. 21 depicts how hours for the hypothetical set of FIG. 20 may be allocated for past due tasks.

FIG. 21 exemplifies how the 30 hours of extra time accrued during Days 8-17 may be utilized in accordance with features of the present invention. The 30 hours are apportioned between tasks having past due dates and tasks having future pending due dates and/or a priority basis for scheduling, while allowing some hours to get ahead of imminent deadlines on Days 15 and 17. The hours may be apportioned in any ratio desired, or a minimum hours may allocated to get ahead of deadlines, though for the sake of illustration, are apportioned into thirds for each. Accordingly, 10 hours 2006a are apportioned to get ahead of deadlines, 10 hours are apportioned to future or priority tasks 2006b, and 10 hours are apportioned to past due tasks 2006c, thereby allowing a person to complete tasks ahead of schedule (and thus allowing for contingencies), and also facilitating the completion or closing out of past due tasks. As shown in FIG. 21, tasks 2006a, 2006b, 2006c, and 2008b may be assigned "quasi" due dates equal to when they would be completed if scheduled as shown in FIG. 21, which would be Day 17, and task 2008a would have a quasi due date of Day 15.

Figure 22:
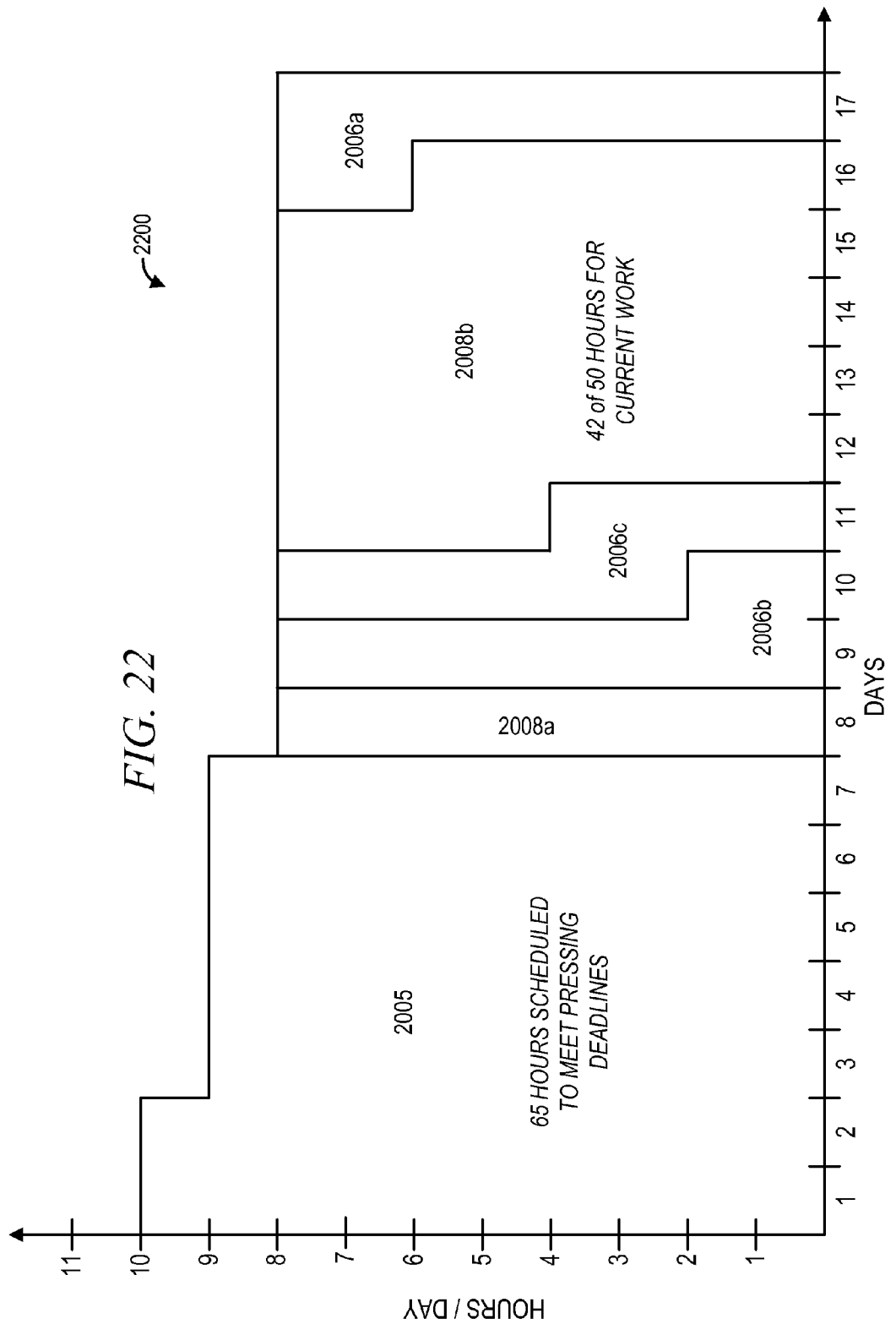
FIG. 22 depicts how hours for the hypothetical set of FIG. 20 may be allocated to complete new high-priority work as soon as possible using regular hours.

FIG. 22 illustrates how the tasks of FIG. 21 may scheduled if they are scheduled as contiguous hours, based on their quasi due dates. Of the total of 80 hours available to work during Days 8-17 to allow 65 new hours 2005 of "rush" work to be completed prior to completion of the 30 hours of work 2006, without missing any deadlines. As shown, all tasks are completed before the deadline on Day 17.

Figure 1:
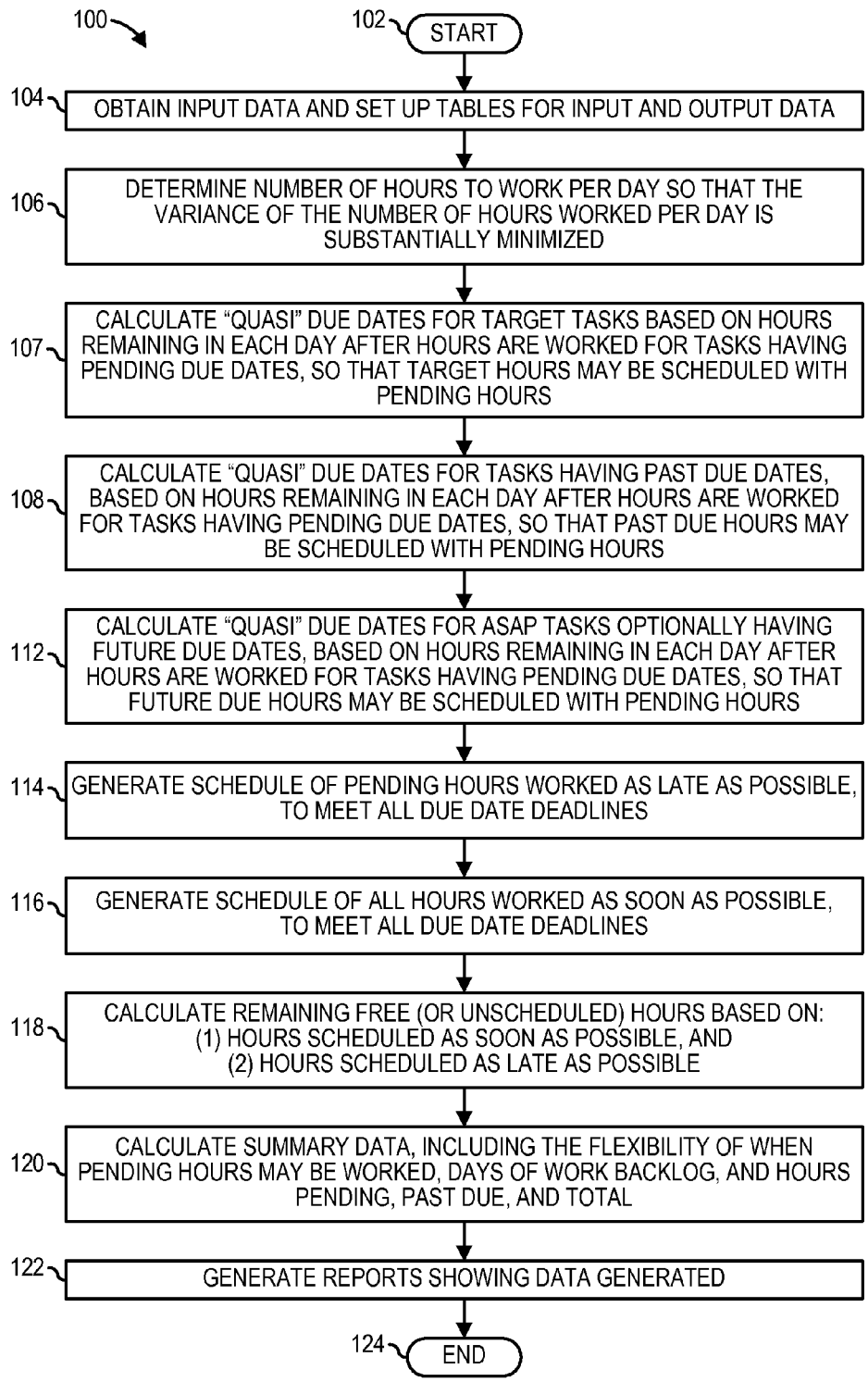
FIG. 1 depicts a high-level flow chart illustrating control logic executable by a data processing system embodying features of a preferred embodiment of the present invention for performing time management and scheduling of multiple tasks.

FIGS. 1-17 exemplify selected details of one preferred method in which the forgoing features of the invention may be achieved. Referring to FIG. 1 of the drawings, the reference numeral 100 generally designates a high-level flow chart embodying features of the present invention. The logic of the flow chart may be implemented on a task management program such as Microsoft Outlook™ or a task, project, and/or action (hereinafter collectively referred to as "task" or "tasks") docketing program, that may be used to track deadlines of tasks to be completed. For each task, certain persons or groups of persons are assigned to accomplish the task, and an estimated number of hours is assigned for each person or group of persons to accomplish the task. Given the deadlines and hours, the minimum number of hours that each person or group of persons must work is calculated such that the deviation of hours worked per day from one day to the next day is minimized.

In step 104, task data (e.g., such as shown in steps 204, 206, 302, 304, and 306) that is necessary to manage and schedule the tasks is obtained. In step 106, hours required to meet all deadlines are calculated and distributed as evenly as possible to, among other things, determine how many more hours may be required than are available to be worked, or how many hours are available each day to work on tasks that do not have pending (imminent) deadlines.

In step 107, for target tasks having target due dates, "quasi" due dates are calculated based on hours remaining in each day after hours are worked for tasks having pending due dates, so that target hours may still be scheduled with pending due dates. In step 108, for tasks ("past tasks") whose due dates are all past, but which tasks are not yet closed, "quasi" due dates are calculated so that such tasks may still be scheduled with pending due dates and/or closed out. In one preferred embodiment of the invention, after the hours needed to meet all deadlines are calculated and distributed in step 106, the difference between the distributed hours and the hours available to be worked by a person is calculated for each day. A portion of the difference is allocated to the past tasks, and past tasks are preferably assigned the hours in order of how late each respective past task is. Based on the allocated hours, a completion date is calculated for each past task, and the completion date is treated as the "quasi" due date for each such task when tasks are scheduled, as discussed in further detail below with respect to step 114.

In step 110, tasks are identified which are to be scheduled on a priority basis, possibly including also future (i.e., not imminent) due dates. In step 112, quasi due dates are calculated for the tasks identified in step 110.

In step 114, hours are scheduled for work as late as is possible given the respective deadlines of each task. In step 116, a work schedule is generated, wherein hours are scheduled as it is anticipated that they would actually be worked in an optimal manner. That is, available hours to be worked by a person are scheduled as soon as possible to meet all due date deadlines, including quasi due date deadlines.

In step 118, "free" hours are calculated based on the number of hours remaining as the difference between the hours that a person is available to work and the hours that are scheduled as soon as possible, in step 116, thereby providing an indication of when new tasks may be worked without being any special priority. Free hours are also calculated as the difference between the hours that a person is available to work and the hours that are scheduled (or deferred) as late as possible, in step 114, thereby providing an indication of the hours that may be available to work high-priority tasks sooner rather than later, as may be needed for "emergency" and/or "rush" jobs.

In step 120, due to the relatively large quantity of data that may result from the foregoing steps 106-118, it is preferable to summarize some of the data to render it more readily meaningful to a user. For example, the number of days of a user's backlog, or work log, may be calculated, as exemplified in step 1530, discussed in further detail below. A flex factor is calculated in steps 1502-1528 to give a user an idea of closely he must adhere to work schedule generated in step 112, or conversely, how flexible he may be with respect to adhering to such work schedule. Other summary items may include a tally of the number of hours scheduled for tasks that have pending due dates versus the number of hours scheduled for past tasks having no pending due dates, and for which therefore quasi due dates are calculated and used.

In step 122, various detailed reports may be generated. For example, reports may be generated showing various statistics for each day of a period for which hours and task due dates are accounted, as discussed further below with respect to step 1604. A work schedule may be generated in which tasks are actually scheduled for a user, as discussed further below with respect to step 1606. Various information may be supplied for each task, such as the number of hours that a user should work on each task on each day (from step 116), the minimum number of hours he should work each day (at least initially, from step 114), and projected completion date for the task, and the like.

The steps of FIG. 1 are described in further detail in FIGS. 2-16. While it is believed that the flow charts of FIGS. 2-16 provide sufficient disclosure such that a person having ordinary skill in the art, upon a review of the present description of the invention, would understand the present invention, and therefore not require further description, selected aspects of the figures will be described further herein. It is understood that FIGS. 2-16 only represent one preferred embodiment whereby the invention may be implemented.

Figure 2:
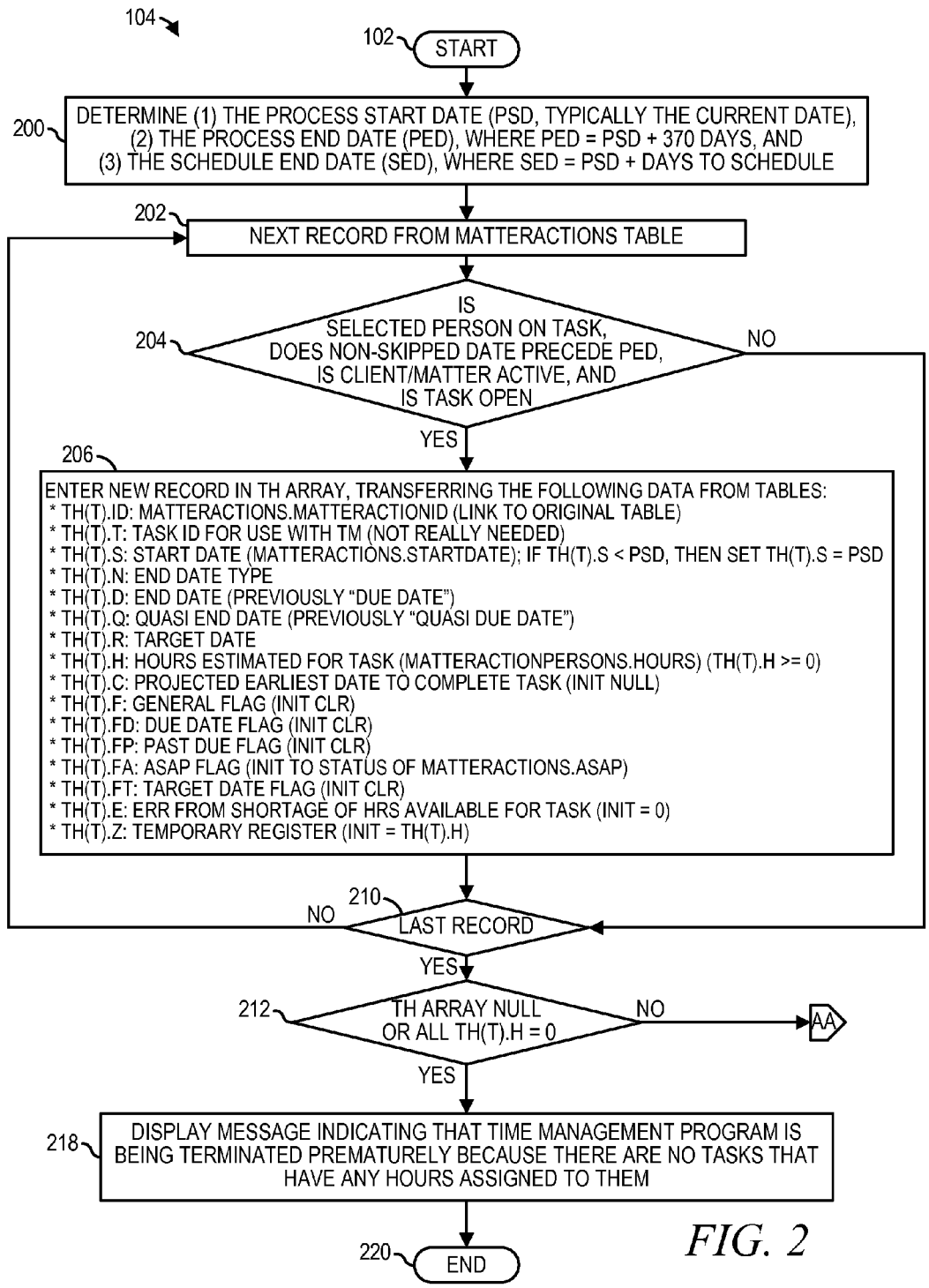
FIGS. 2-16 depict details of the flow chart of FIG. 1.
Figure 3:
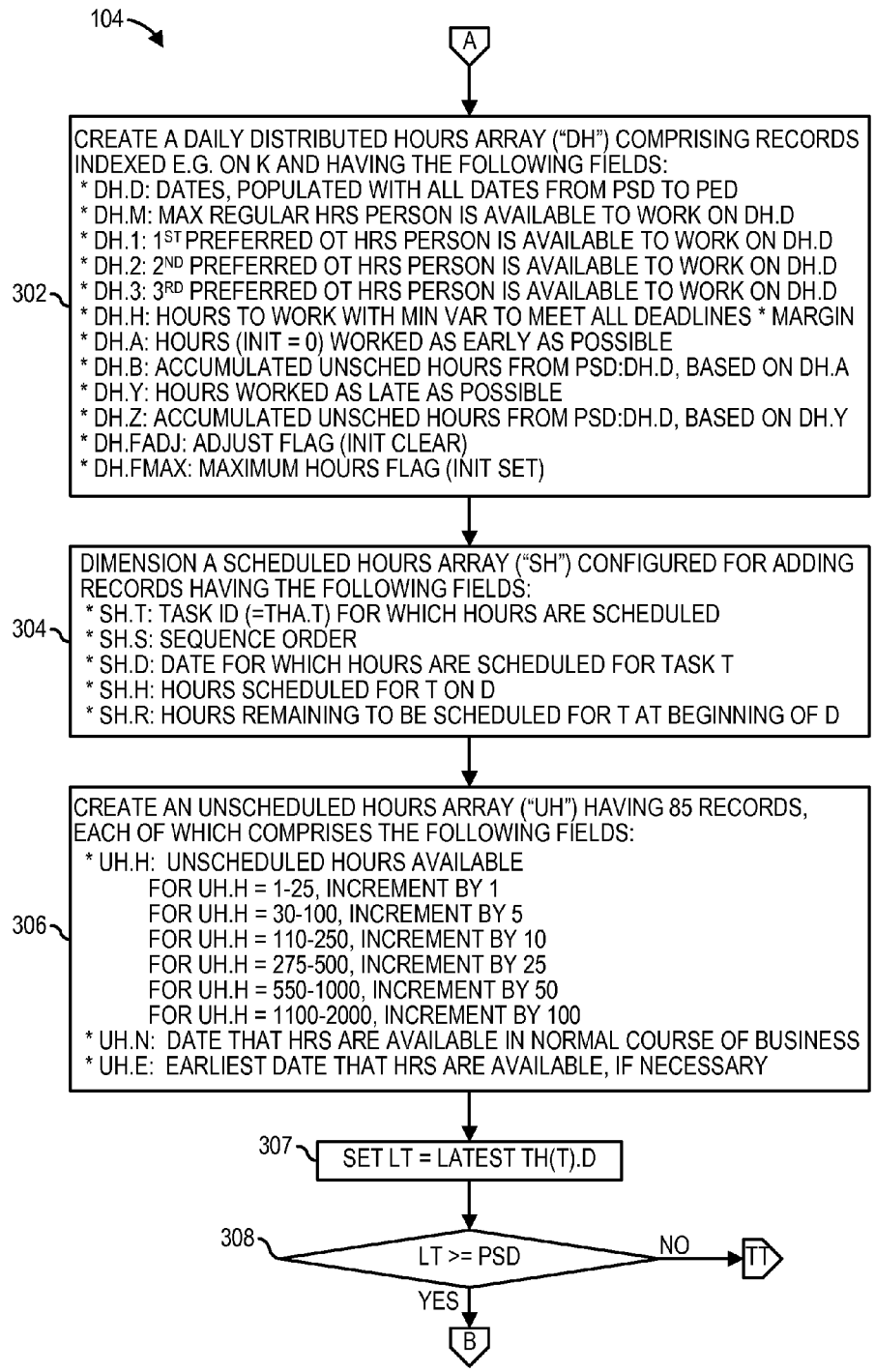

FIG. 2 shows process start and end dates that must be input in step 200, and data relating to tasks to be managed in step 206. The latest due date of any task (LT) is derived from the data entered in step 206, and is set in step 307 (FIG. 3). The sum of hours for all tasks is preferably determined in step 212. If in step 212 it is determined that the sum of hours for all tasks is zero, a message is displayed in step 218, and the program is terminated in step 220 for lack of hours to manage.

In FIG. 3, three arrays are created in steps 302, 304, and 306 for output data that the program generates. In step 308, if the LT precedes the Process Start Date (PSD), then execution proceeds to step 7100, described in further detail below with respect to FIG. 7.1. Otherwise, execution proceeds to step 402.

Figure 4:
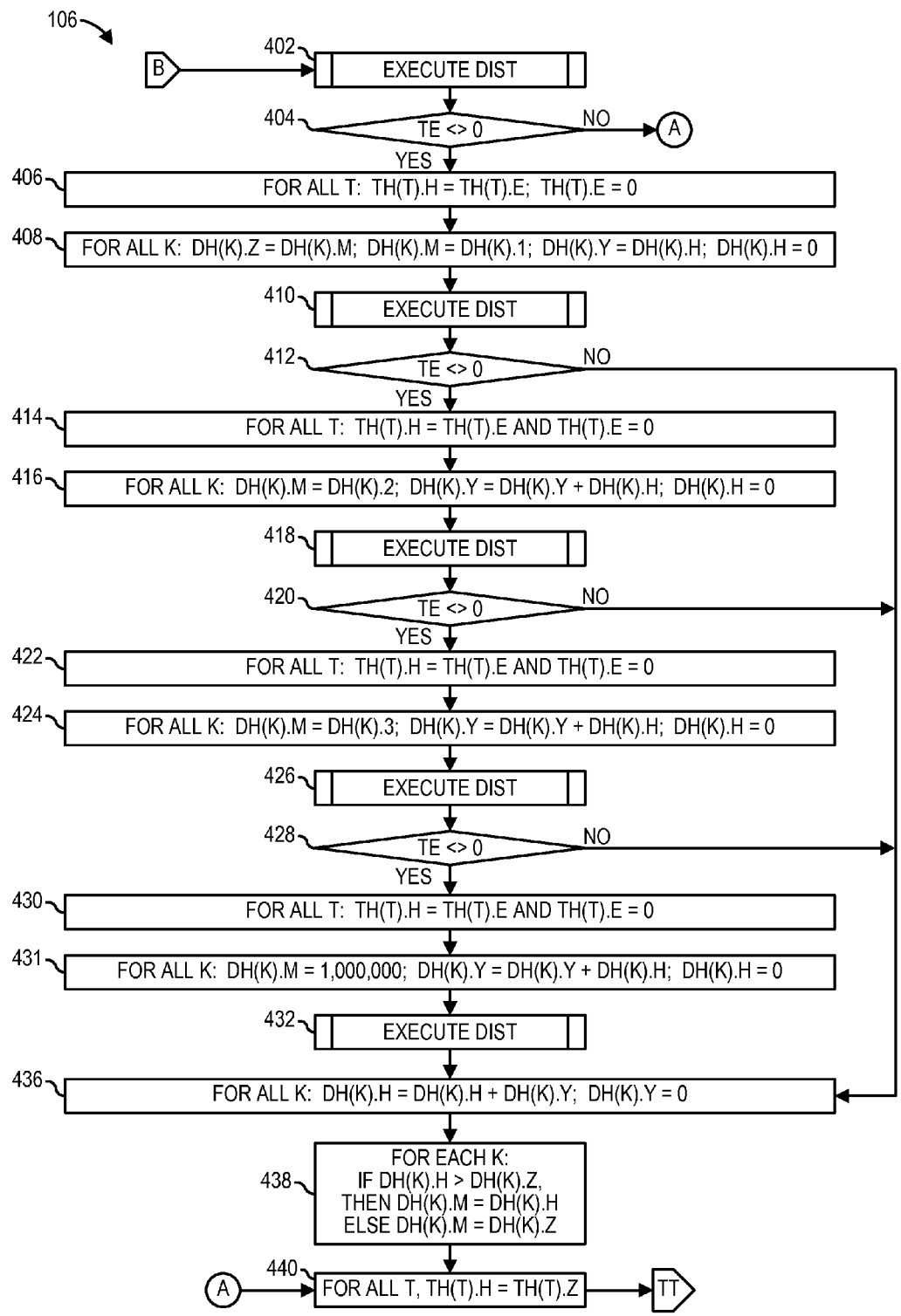

FIGS. 4-7 depict one preferred embodiment to distribute hours as evenly as possible across all dates to meet deadlines. In FIG. 4, step 402, a subroutine designated by the label DIST is called, or executed, ro distribute hours.

Figure 5:
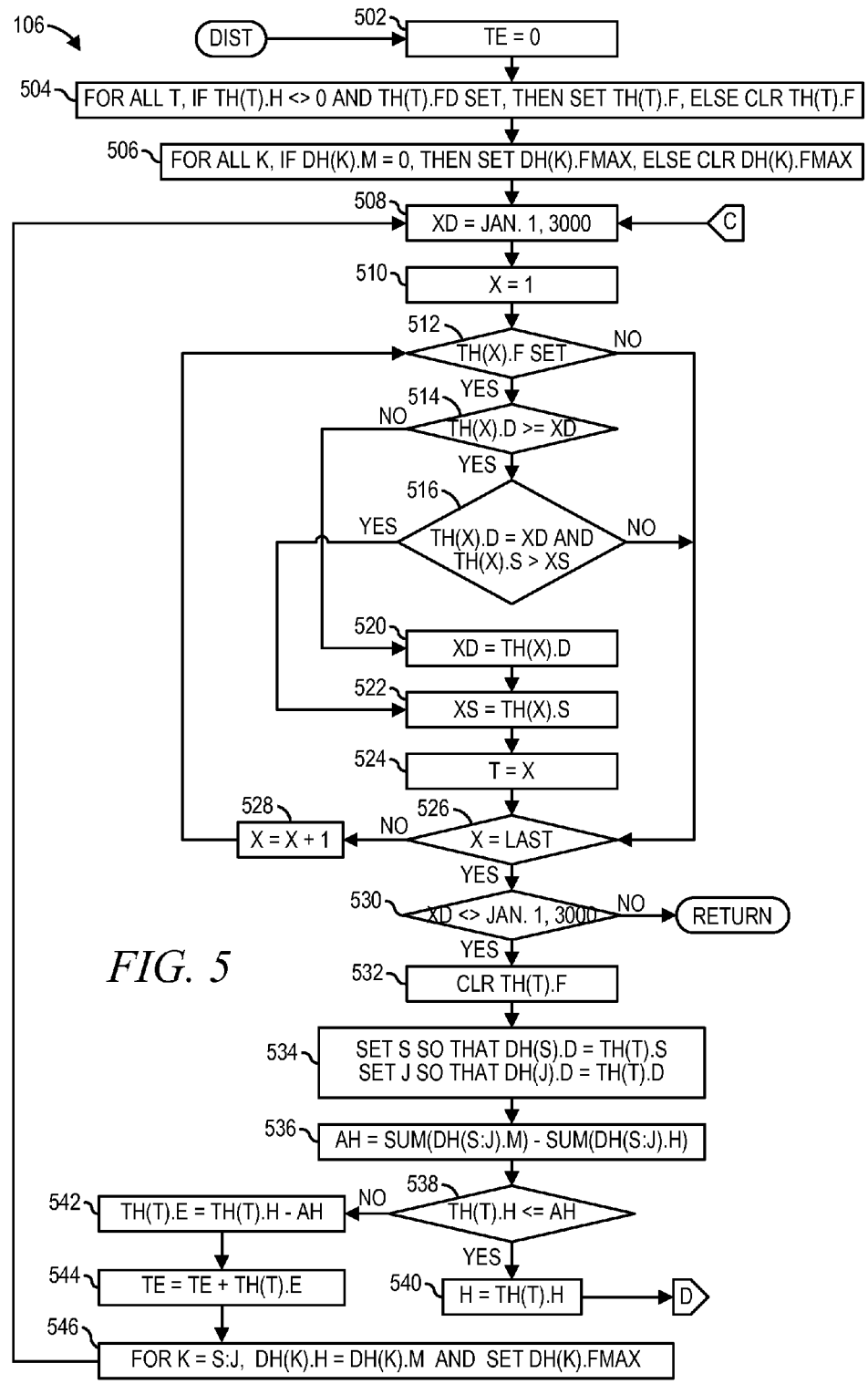
Figure 6:
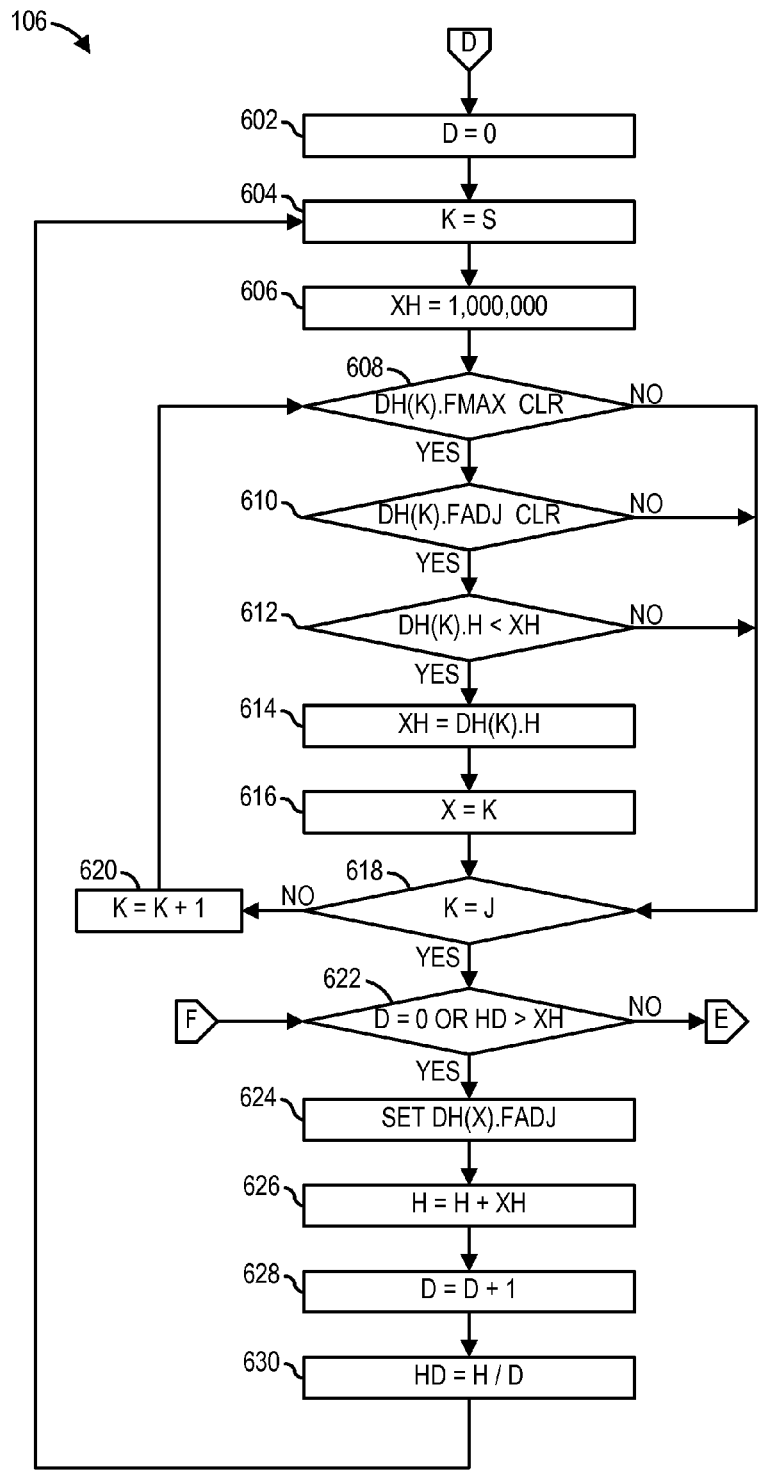
Figure 7:
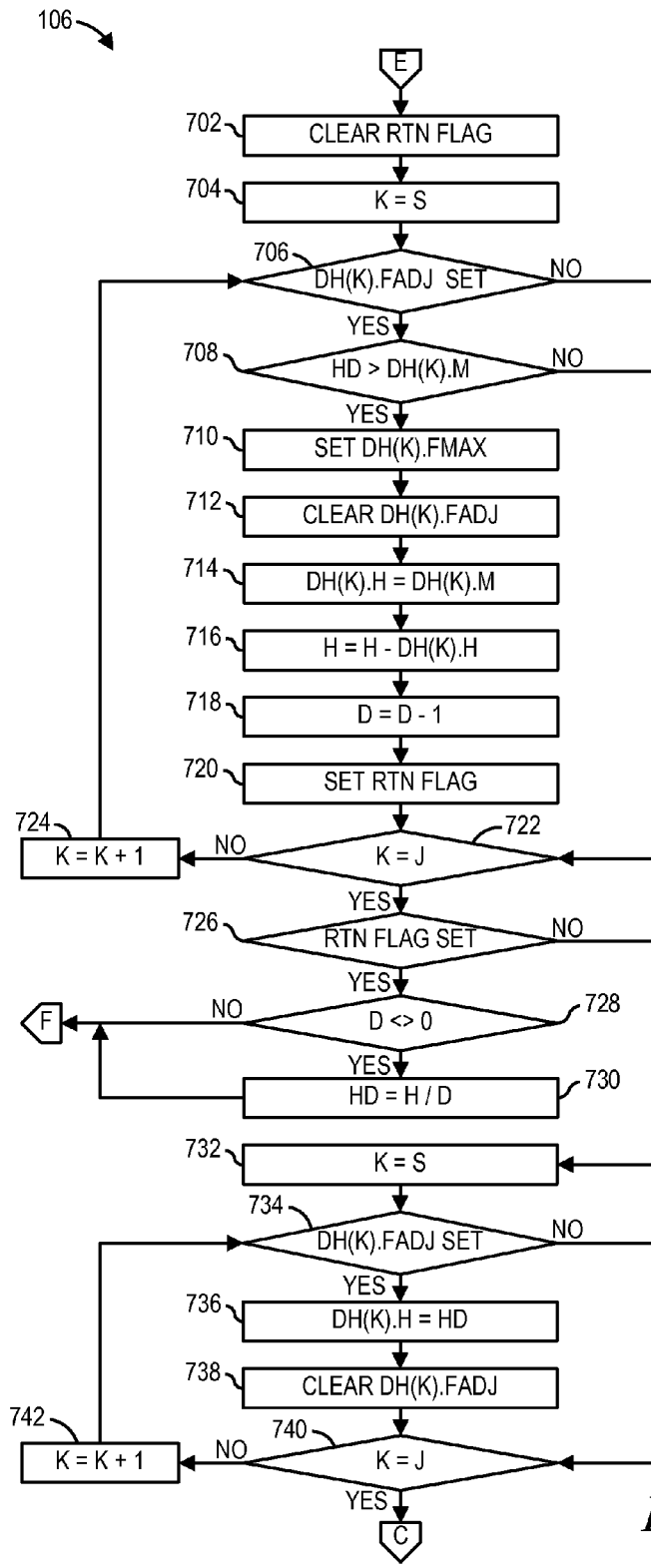

The DIST subroutine is set forth in FIGS. 5-7. In step 502, TE is set equal to zero. In step 504, all tasks (step 206) are reviewed and, if the hours for a task are not zero and the due date is subsequent to the PSD, then a flag for the task is cleared. In step 506, all dates (step 302) are reviewed and if the hours represented as the regular hours for a date are zero, then an FMAX flag for that date is set.

In step 508, an due date variable XD is set equal to a future date, such as Jan. 1, 3000, that is expected to exceed any due date in the tasks, and in step 510, a task ID variable X is set equal to 1. In step 512, a determination is made whether the flag for task X is clear (i.e., not set) and, if it is clear, then execution proceeds to step 514; otherwise, execution proceeds to step 526, described below. In step 514, a determination is made whether the due date for the task X is less than or equal to XD and, if it is, then execution proceeds to step 516; otherwise, execution proceeds to step 526. In step 516, a determination is made whether the due date for the task X is equal to XD and, if it is, then execution proceeds to step 518; otherwise, execution proceeds to step 520. In step 518, a determination is made whether the start date for the task X is greater than a task start date variable XS and, if it is, then execution proceeds to step 520; otherwise, execution proceeds to step 526. In step 520, XS is set equal to the task start date; in step 522, XD is set equal to the task due date, and in step 524, a task ID variable T is set equal to the variable X. In step 526, a determination is made whether the X represents the ID of a last task and, if it does, then execution proceeds to step 530; otherwise, execution proceeds to step 528. In step 528, X is incremented, and execution returns to step 512.

In step 530, a determination is made whether XD is equal to the future date used in step 508 and, if is equal, then execution of the DIST subroutine is terminated and execution returns to the calling routine (FIG. 4); otherwise, execution proceeds to step 532. In step 532, the task flag is set. In step 534, a variable S is set so that a date S from step 302 is equal to the task start date, and a variable J is set so that a date J from step 302 is equal to the task due date. In step 536, an accumulated hours variable (AH) is set equal to the hours represented as regular hours in the dates of step 302 between the start and end dates of a subject task, less the hours that have already been allocated for other tasks between the respective start and due dates. In step 538, a determination is made whether the hours required for the present task are less than or equal to Ah and, if they are, then execution proceeds to step 540, wherein a variable H is set equal to the hours required for the task, and execution proceeds to step 602; otherwise, execution proceeds to step 542. In step 542, an error hours variable for the respective task is set equal to the number of hours of the task that exceed AH. In step 544, the error hours calculated in step 542 are added to TE. In step 546, for each date between and including the start and end dates of the task, the hours scheduled for a date are set equal to the hours represented as the maximum hours available to be worked that date, and the FMAX flag for the date is set.

FIG. 6, steps 602-620 show how each date is analyzed so that with the fewest hours of work assigned to it is identified. In step 622, if the first date (i.e., D=0) is being examined or if a current hours per day (HD) exceed the minimum hours (XH) available as determined in steps 604-620, then execution proceeds to consider that date for further analysis (FIG. 7) by setting a FADJ flag; otherwise, execution proceeds to step 702, described in further detail below with respect to FIG. 7.

In FIG. 7, steps 702-724, it is determined whether the hours per day (HD) exceed the maximum number of hours that are available to be worked on each day identified by a set FADJ flag. If HD exceeds the maximum number of hours that are available for a date, then the FMAX flag for that date is set so that no more hours will be assigned to it. If the RTN flag is set, then execution returns to step 618; otherwise, execution proceeds to step 732-742 to assign HD to all dates having a set FADJ flag, and execution returns to step 508.

Returning to FIG. 4, in step 404, a determination is made whether TE is equal to zero and, if it is, then execution proceeds to step 800; otherwise, execution proceeds to step 406. At step 406, for all tasks, the original hours for the task are stored in temporary storage, the hours for the task are set equal to the error hours for the task, and the error hours for the task are set equal to zero. In step 408, for all dates, the original regular hours to work are stored in temporary storage, and the regular hours to work are increased to include a first set of overtime (OT) hours. In step 410, the DIST subroutine is again executed, as described above, but for the first set of OT hours.

In step 412, a determination is made whether TE is equal to zero and, if it is, then execution proceeds to step 434; otherwise, execution proceeds to step 414. At step 414, for all tasks, the hours for the task are set equal to the error hours for the task, and the error hours for the task are set to zero. In step 416, for all dates, the regular hours to work are increased to include a second set of OT hours. In step 418, the DIST subroutine is again executed, as described above, but for the second set of OT hours.

In step 420, a determination is made whether TE is equal to zero and, if it is, then execution proceeds to step 434; otherwise, execution proceeds to step 422. At step 422, for all tasks, the hours for the task are set equal to the error hours for the task, and the error hours for the task are set to zero. In step 424, for all dates, the regular hours to work are increased to include a third set of OT hours. In step 426, the DIST subroutine is again executed, as described above, but for the third set of OT hours.

In step 428, a determination is made whether TE is equal to zero and, if it is, then execution proceeds to step 434; otherwise, execution proceeds to step 430, in which an error report is generated, and in step 432, execution is terminated.

In step 434, for all tasks, the hours to complete the task are restored to their original hours. In step 436, for all dates, the hours to work are set the greater of original regular hours to work, or the distributed hours required to meet deadlines. Execution then proceeds to step 800.

Figure 8:
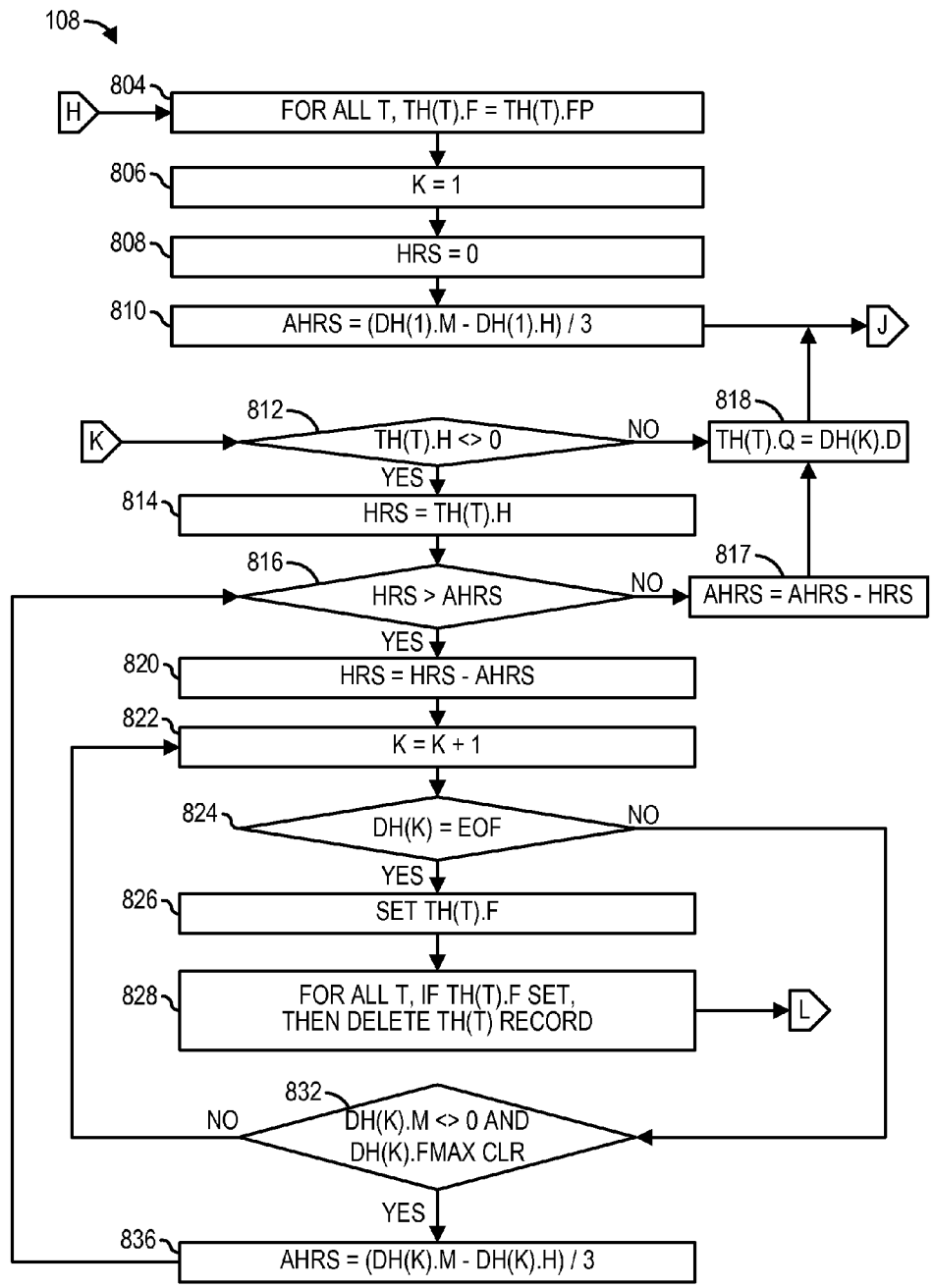

In FIG. 8, a "quasi" due date is calculated for each task for which all due dates are past due. If a due date is not past due, then the quasi due date is set equal to the due date. In steps 804-810, certain data values are initialized, and then execution proceeds to steps 902-930 of FIG. 9, wherein tasks to be examined for determining a quasi due date are determined in ascending order of due date and hours required to complete a task.

In steps 812-836, hours for tasks having past due dates are assigned to a portion of the hours available each day that are not used when hours are distributed as per step 106 (FIGS. 1 and 4-7), and as exemplified above with respect to FIG. 21. An estimated completion date of such tasks is then determined and used as the "quasi" due date for such task in scheduling hours for tasks.

Figure 9:
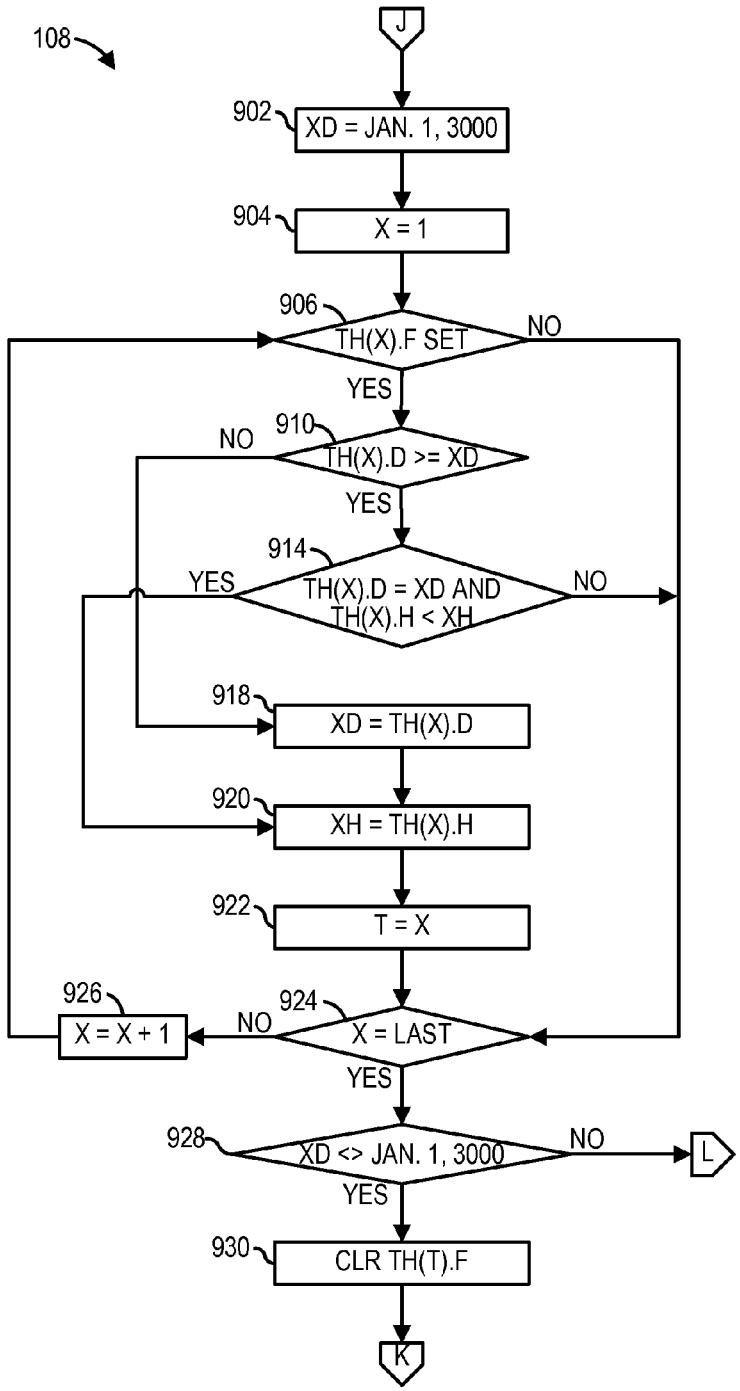

FIGS. 9.2 and 9.3 show how quasi due dates for priority hours are generated.

Figure 10:
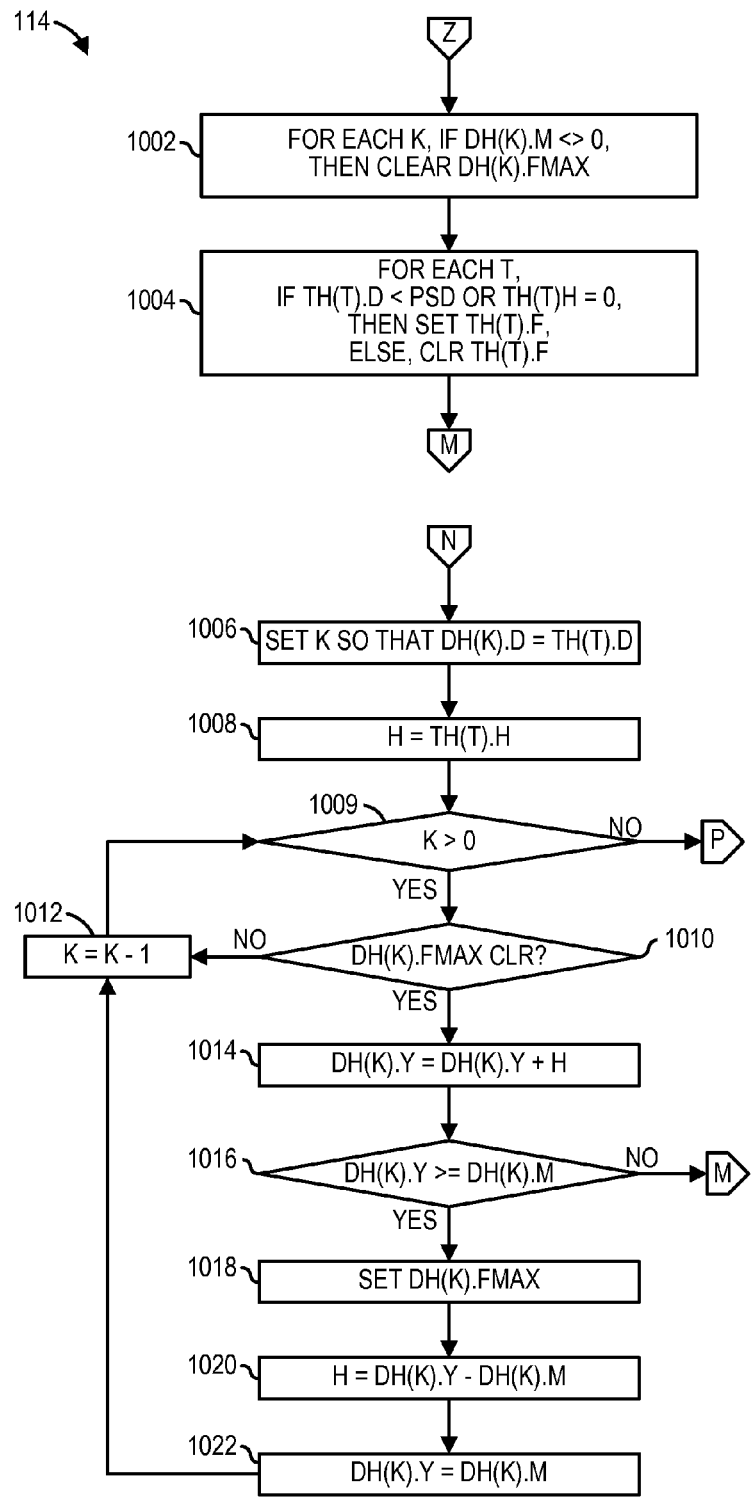
Figure 11:
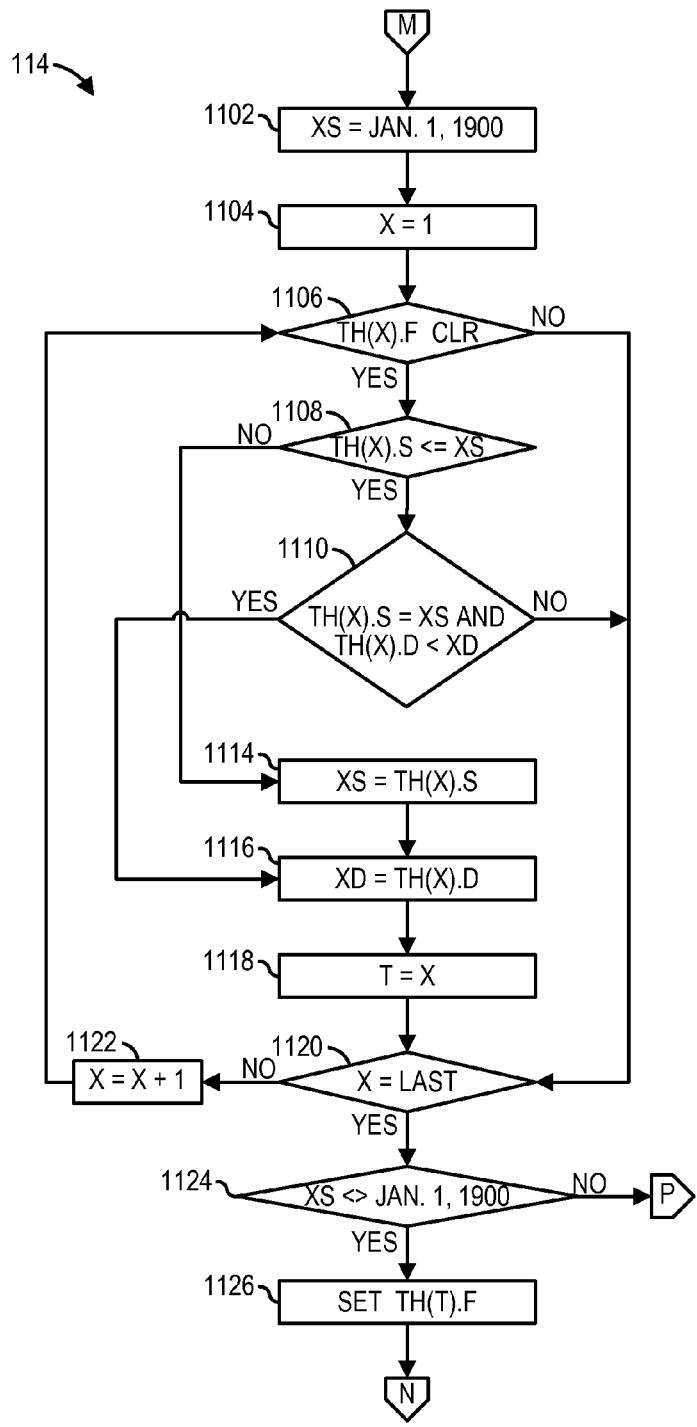

In FIG. 10, steps 1002-1022, hours for pending (preferably not past due) tasks are scheduled so as to be deferred as much as possible so that ready determinations may be made when necessary to schedule high priority tasks that may arise, often referred to as "emergencies" or "rush" jobs, and as discussed above with respect to the 50 hours of FIG. 22. Tasks are scheduled in an order specified in steps 1102-1126 of FIG. 11 descending order of start dates first, and due dates second.

Figure 12:
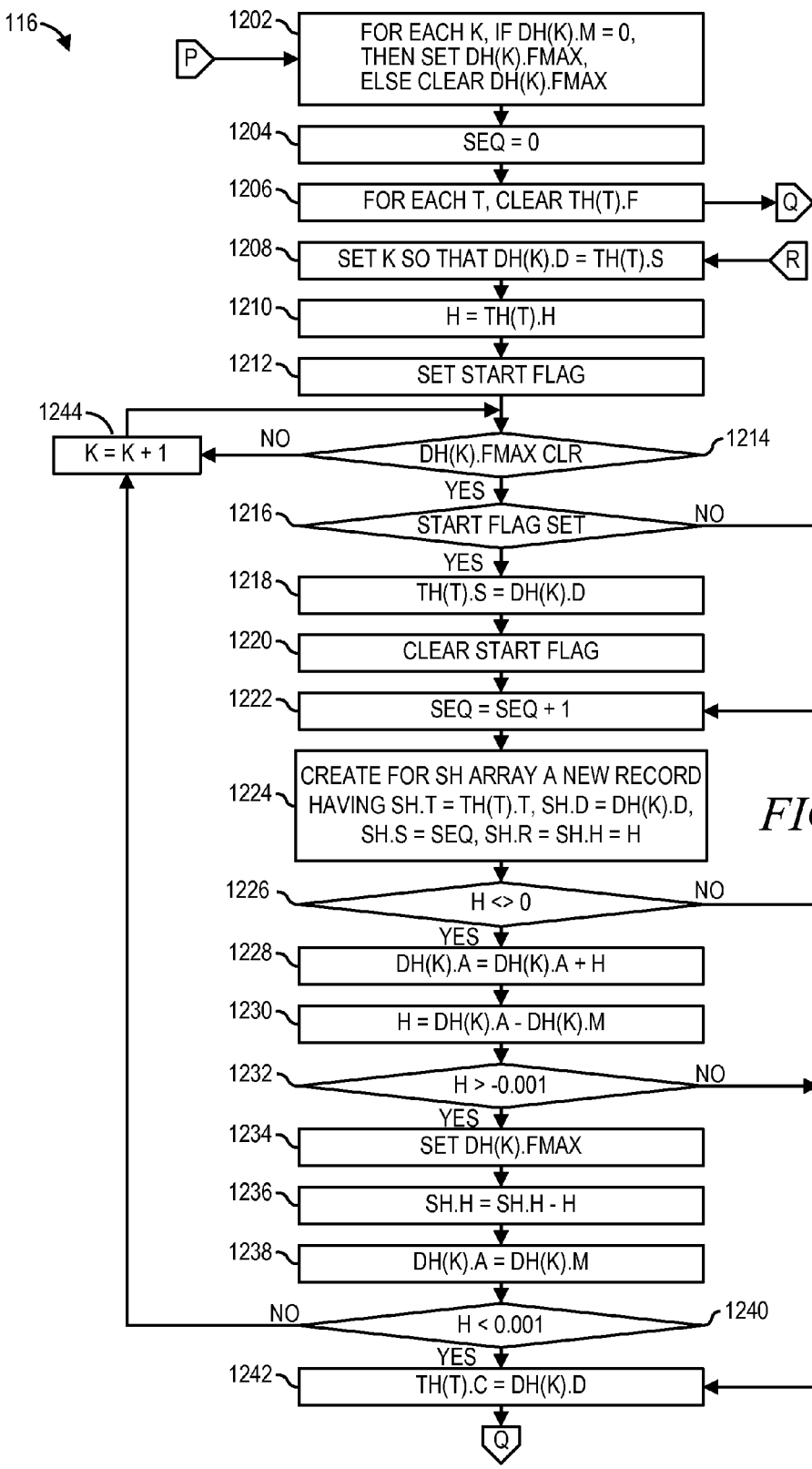

In FIG. 12, steps 1202-1242, tasks are scheduled to generate a work schedule optimized so that the average completion date of all tasks is as early as possible. As depicted by steps 1302-1338 of FIG. 13, tasks are preferably scheduled in ascending order of quasi due dates first (noting from step 206 that if a task is not past due, then the quasi due date is set to the original due date), on original due dates second, on start dates third, and on hours required to complete a task fourth.

Figure 13:
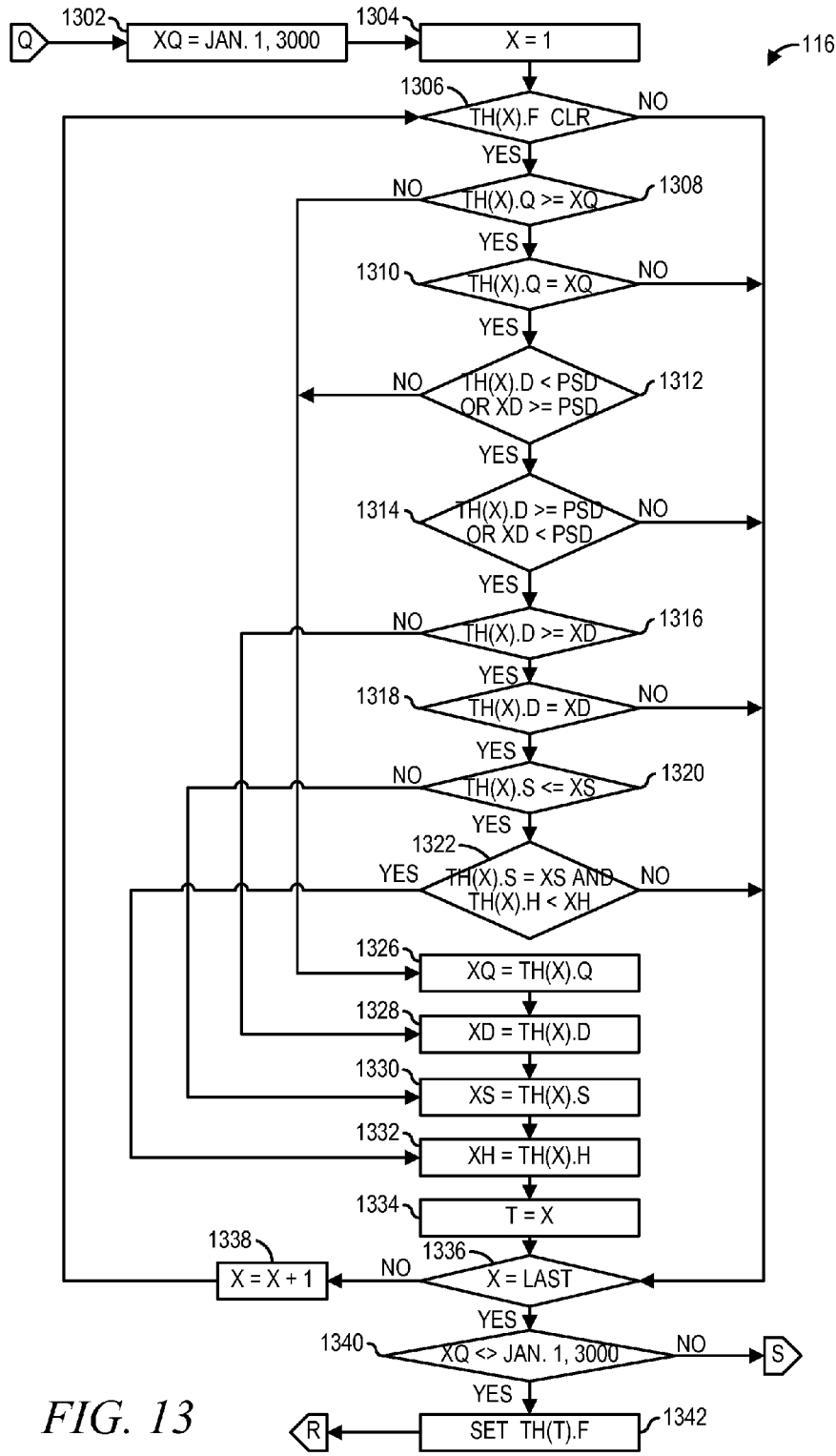
Figure 14:
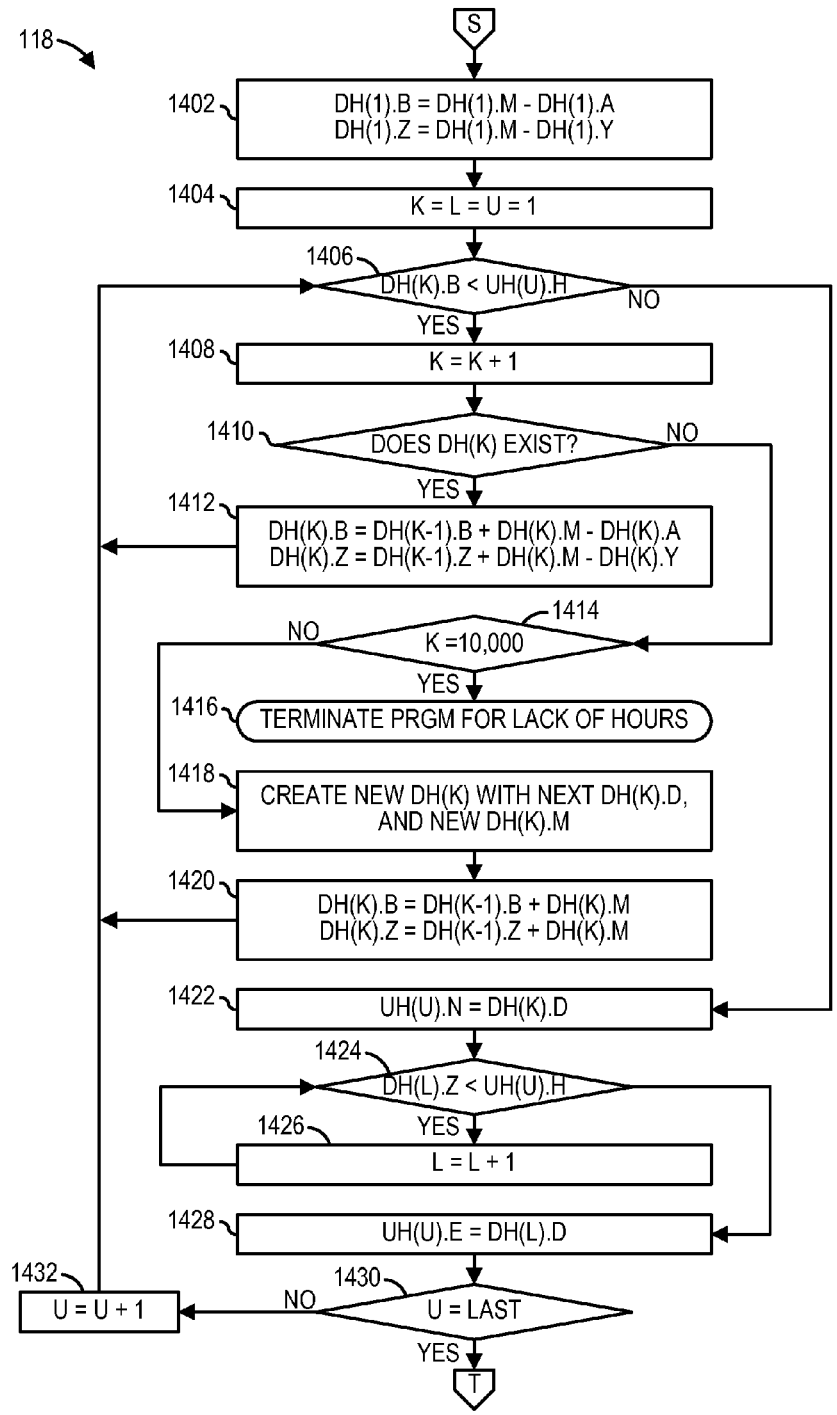

In steps 1402-1432 of FIG. 14, a determination is made of hours that are available to be worked for each day, but which have not been scheduled to be worked in accordance with steps 1202-1338 of FIGS. 12-13. The hours so calculated permit a ready determination to be made of when new work or tasks may be completed in the normal course of business, i.e., without taking priority over any existing work or tasks, discussed above with respect to the 30 hours FIG. 22.

Figure 15:
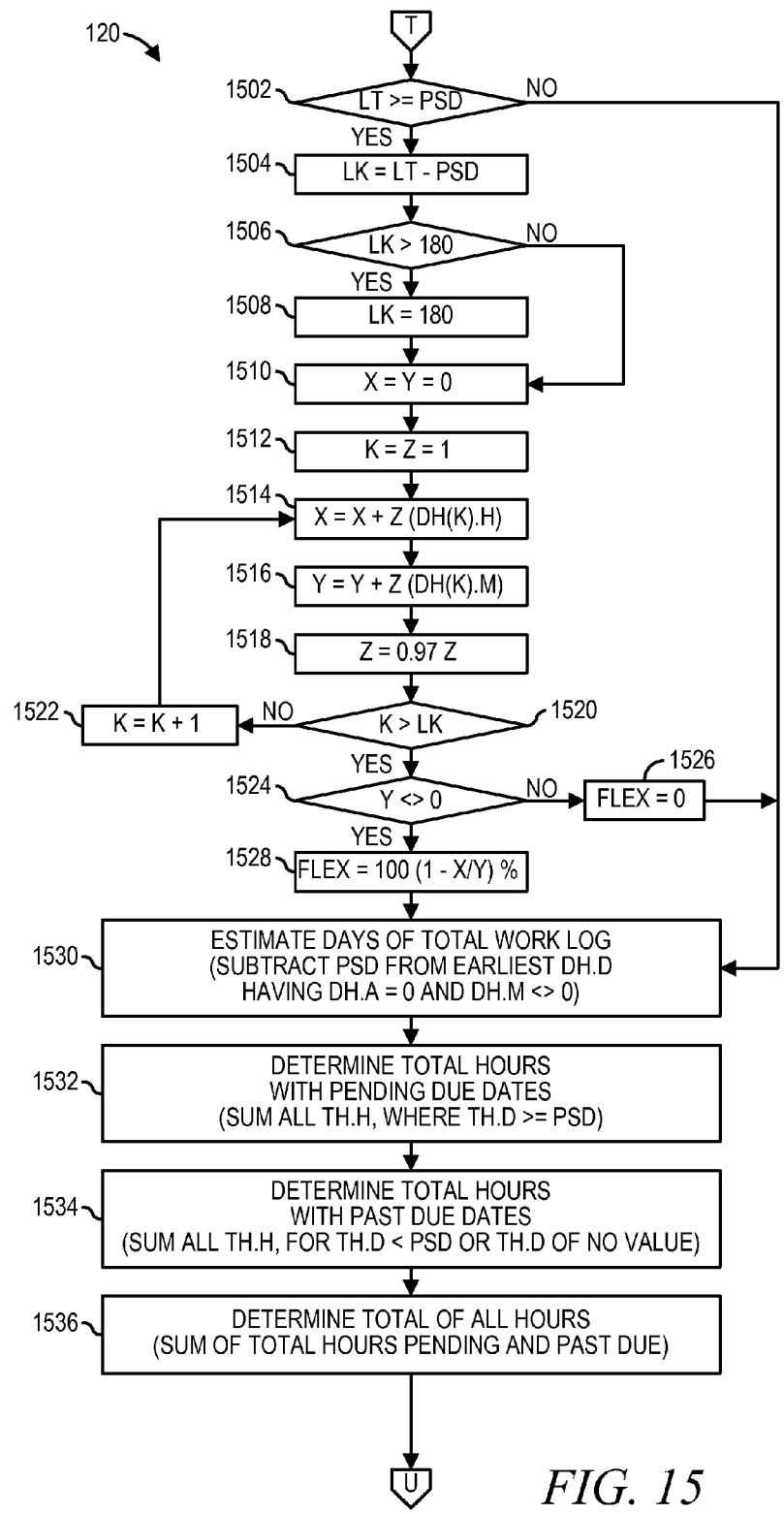

In steps 1502-1528 of FIG. 15, a "flex" factor is calculated based on the distribution of hours determined in FIGS. 4-7 for a number of days, such as 180 days, out from the PSD. For each of the 180 days, the distributed hours and the hours that are available to be worked are calculated, and the results for each day are given a weight of, for example, 0.97 compared to the previous day. The sum of the distributed hours is divided by the sum of the available hours, and the resulting ratio is subtracted from 1 to give a percentage representing the "flex" factor. The flex factor gives a person a general indication of how flexible he or she may be in following a work schedule generated in accordance with steps 1202-1338 of FIGS. 12-13. Thus, for a relatively high flex factor, a person would be flexible in how he followed the work schedule, and would not need to adhere too closely to a work schedule to meet all deadlines, but if the flex factor is relatively low, then a person would be well-advised to follow the work schedule closely to meet all deadlines (i.e., due dates). It is understood that the number 180 of days and the number 0.97 may be varied as desired.

In step 1530, a person's number of work log (or backlog) is calculated as extending to the first day in which he has no hours scheduled on a day in which he is available to work. In step 1532, the total number of hours having pending dates is calculated, and in step 1534, the total number of hours having no due dates subsequent to the PSD is calculated. In step 1536, the total number of hours is calculated as the sum of the hours calculated in steps 1532 and 1534.

Figure 16:
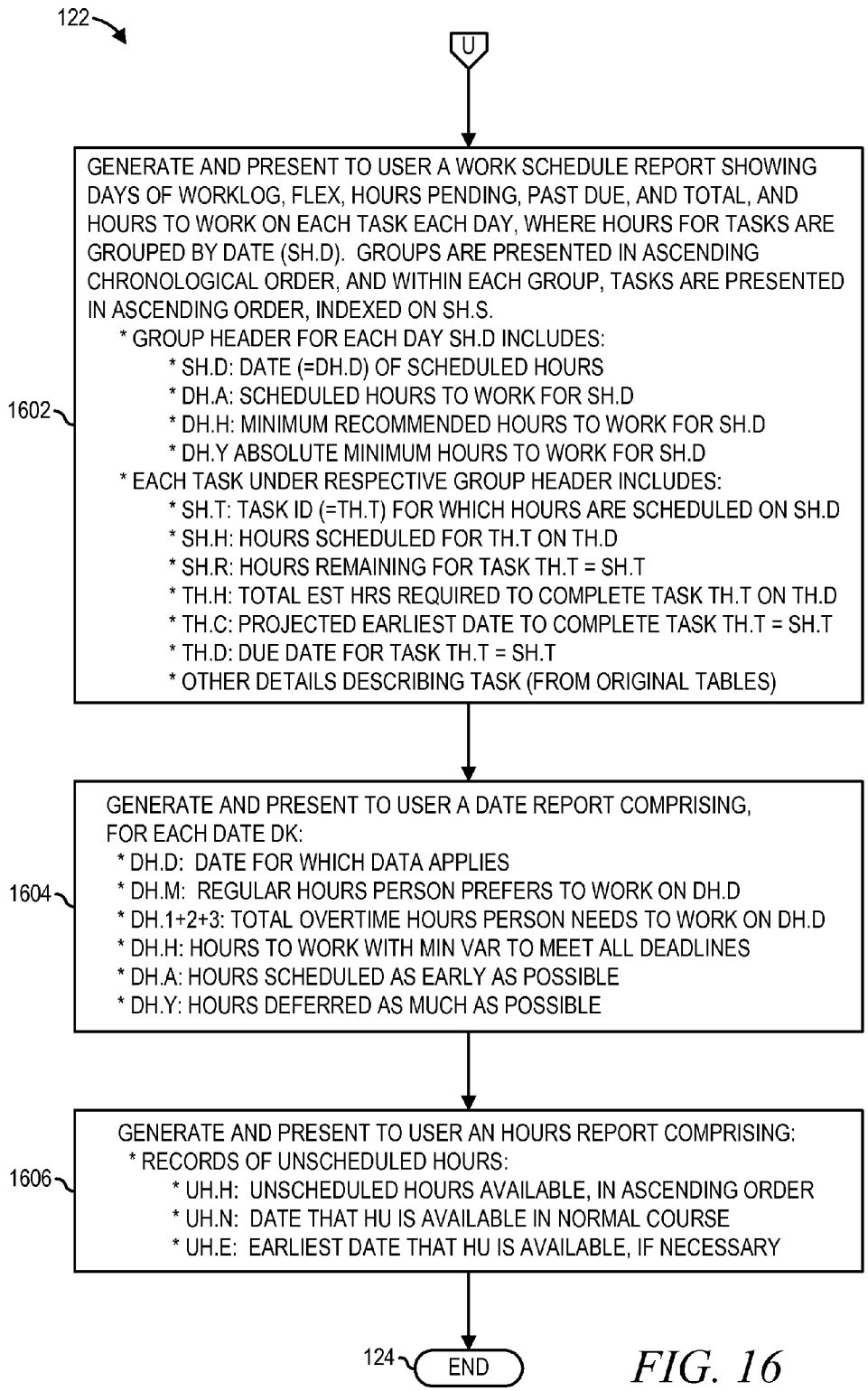

In FIG. 16, three reports are generated. In step 1602, a work schedule is generated showing a person what tasks he should work on in what sequence to meet all deadlines. A general summary of total, pending, and past due hours, the estimated days of backlog, and the flex factor may also be included with the work schedule. In step 1604, a report is generated showing various statistics for each date analyzed. In step 1606, unscheduled hours calculated in FIG. 14 are generated.

In step 120, the program is terminated.

Figure 23:
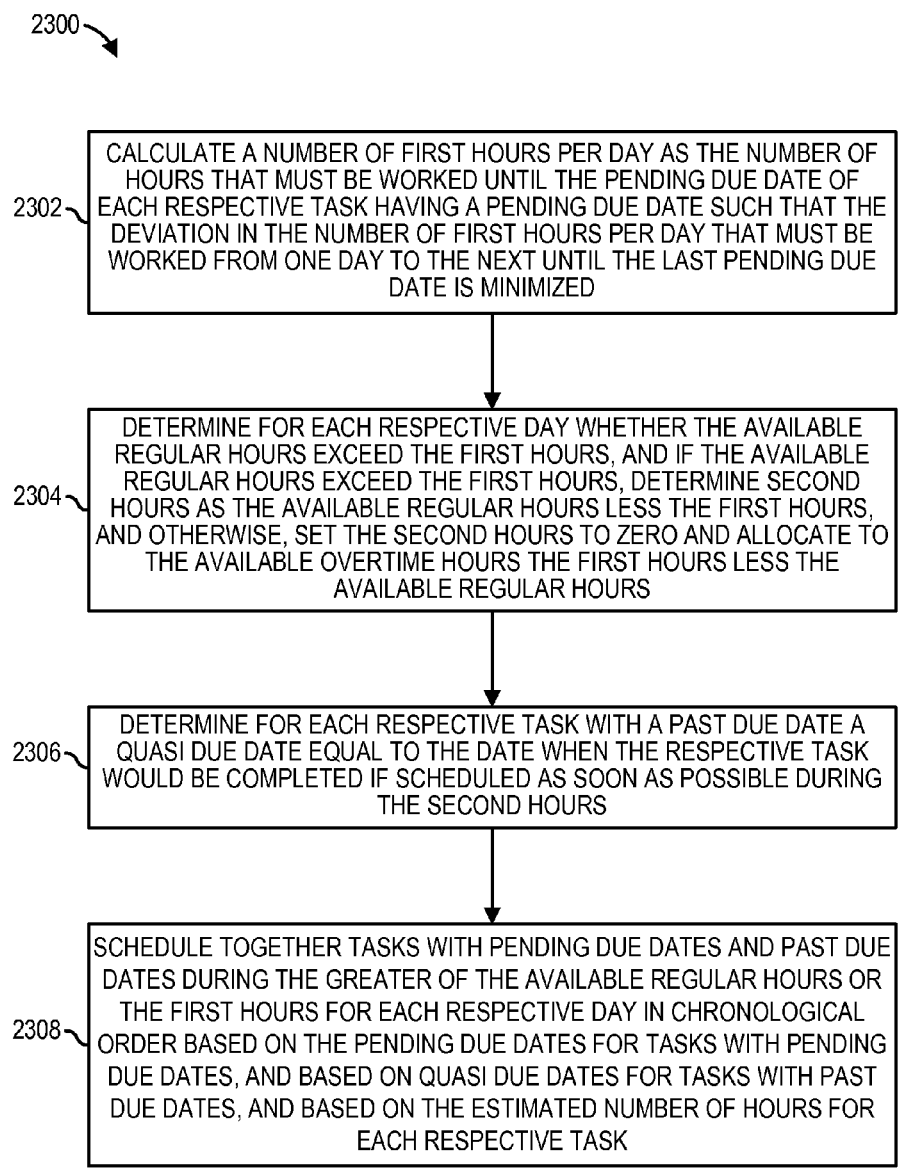
FIG. 23 depicts a high-level flow chart illustrating control logic embodying features of a preferred embodiment of the present invention for scheduling past due tasks with pending tasks.

With reference to past due tasks, in an ideal world, all tasks would be completed on time, but in reality, tasks periodically do not get done on time, and it becomes quite a challenge to then schedule tasks having past due dates with tasks that still have pending (i.e., future) due dates. While it may be somewhat intuitive to plan or schedule tasks all having pending due dates, or even all having past due dates, because such can be scheduled in chronological order, it is not at all obvious how tasks having pending due dates and past due dates (or no pending due dates) may be scheduled together because they may not be scheduled in chronological order (unless all past due tasks are scheduled first, delaying all pending tasks with the possible result that pending tasks then miss their deadline and no tasks are completed on time). The present invention does indeed allow for tasks with pending due dates and past due dates to be scheduled together. It accomplishes this significant advantage by determining how much time would be available after all tasks having pending due dates are hypothetically scheduled using a leveling routine to "level" the hours between respective start dates and due dates, hypothetically scheduling past due tasks during the hours available, estimating the completion dates of such past due tasks, using the estimated completion dates as quasi due dates, and then scheduling tasks with pending due dates together with tasks having past due dates chronologically using pending due dates for tasks with pending due dates, and quasi due dates for tasks having past due dates, and still meet all deadlines. FIG. 23 depicts steps for this technique in a high-level flow chart 2300 which illustrates control logic for scheduling past due tasks (or any tasks without pending due dates) with pending tasks. This is exemplified graphically, by way of FIGS. 19-22, and more specifically, by way of FIGS. 24 and 25, of the present application.

In step 2302 a number of primary hours per day (4 hours/day, FIG. 24) are calculated as the number of hours that must be worked until the pending due date of each respective task having a pending due date (Tasks A and B) such that the deviation in the number of first hours per day that must be worked from one day to the next until the last pending due date is minimized (this is a preliminary step of "leveling", NOT the same as the way tasks would actually be scheduled).

In step 2304, it is determined for each respective day whether the available regular hours exceed the primary hours. If the available regular hours exceed the primary hours, secondary hours (4 hours/day, FIG. 24) are determined as the available regular hours (8 hours/day) less the primary hours (4 hours/day); and otherwise, the secondary hours are set to zero and available hours are increased as overtime hours equal to the primary hours less the available regular hours.

Figure 24:
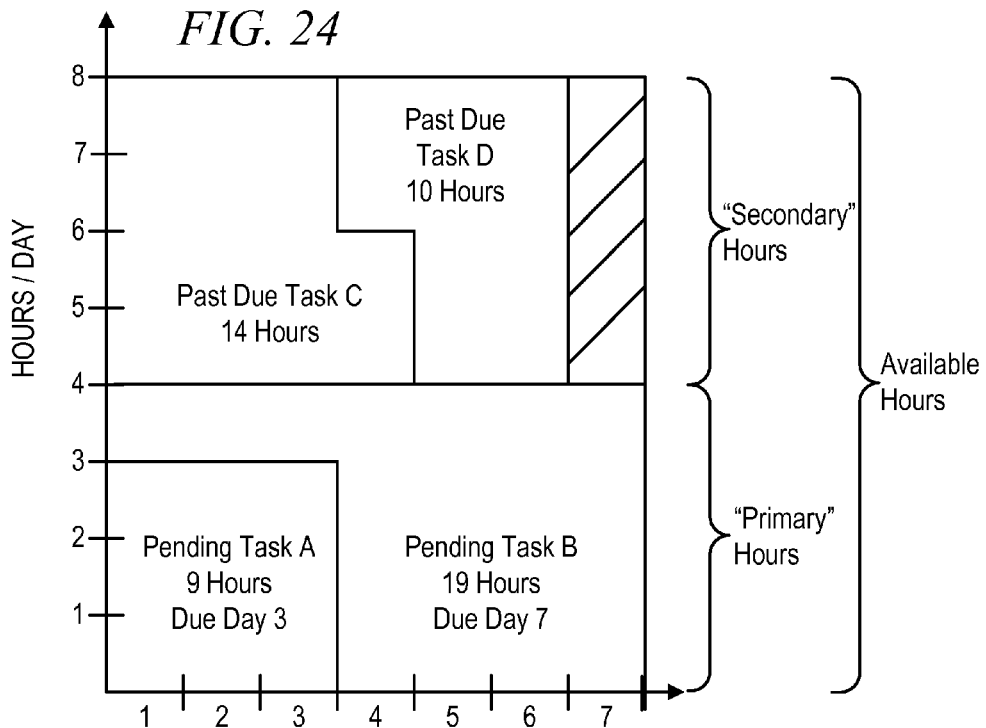
FIGS. 24 and 25 are charts which exemplify the logic of the flow chart of FIG. 23.

In step 2306, for each respective task (C and D) with a past due date, a quasi due date is determined which is equal to the date when the respective task would be completed if scheduled as soon as possible during the secondary hours (Quasi Due Date for Task C=Day 4; for Task D=Day 6; FIG. 24).

Figure 25:
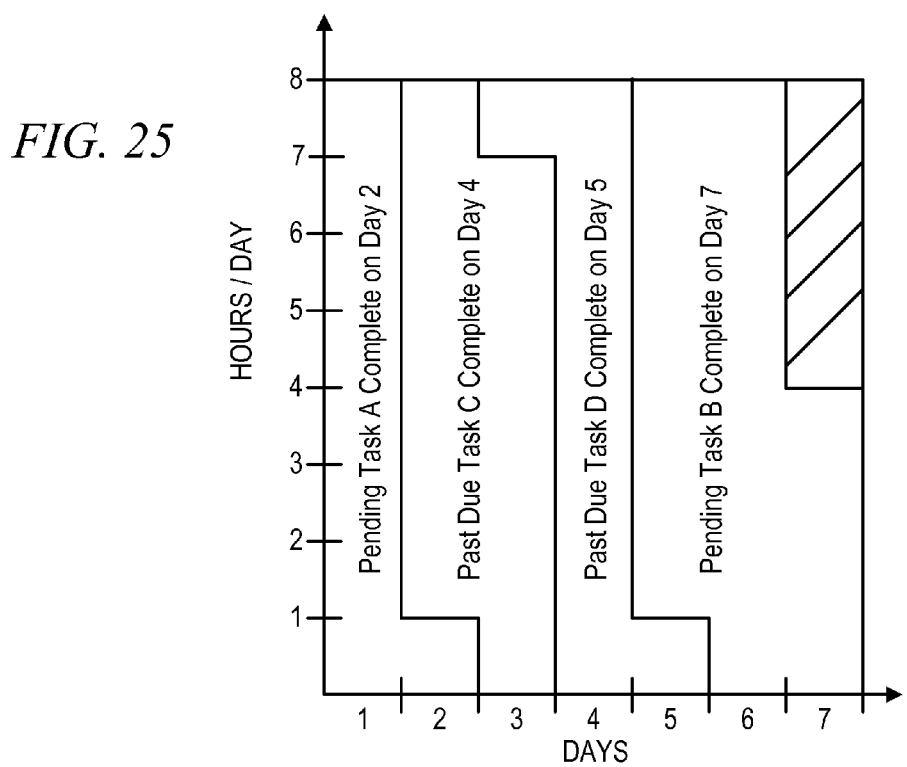

In step 2308, tasks with pending due dates and past due dates are scheduled together during the greater of the available regular hours or the primary (with overtime, not shown in FIG. 24) hours for each respective day in chronological order based on the pending due dates for tasks with pending due dates, and based on quasi due dates for tasks with past due dates, and based on the estimated number of hours for each respective task (FIG. 25). While the prior art would have scheduled the tasks in order of A, B, C, D, a more optimal schedule is as shown in FIG. 25, in which tasks are scheduled in order of A, C, D, B. It may thus be appreciated that the prior art has no mechanism for scheduling past due tasks with pending tasks, and so pending tasks are typically prioritized over past due tasks and so are scheduled prior to past due tasks, as shown below. As a consequence, past due tasks may never get done until all pending tasks are complete and not replaced with newer tasks. In typical cases where there are always new pending tasks arising, past due tasks will never receive any attention.

According to the present invention, an improved method and system is provided which assists users in better managing, organizing, and planning their time. By identifying how many hours are free, a user can readily foretell when a new task may be completed, without over-committing himself or herself, and hence be more responsive to the needs of clients that he or she serves. When a manager has a task that must be done and would desire to know who is most available, the present invention could readily provide such information. If a person desires to take a vacation, he or she could indicate that the available hours for such days is zero, and determine if a vacation is feasible, or could plan around a planned vacation before new commitments are made to complete new tasks. The present invention also assists in determining when backlog is light and, hence, when new work or tasks should be sought. "Flex" would also indicate how flexible a user may be with his or her time. That is, generally high flex value would permit a user to be more flexible with his or her time, but generally low flex values would mean that a user should adhere to a more strict schedule to complete all tasks. If errors are indicated, then that would indicate that a person must work overtime or weekends sooner than he may otherwise realize, thereby reducing last minute rushes to get work done and, possibly, even avoiding missed deadlines.

In a preferred embodiment of the present invention, each task (or action) may be assigned an estimated number of hours, one or more persons to work the hours, as well as a number of dates (e.g., reminder dates, due dates, past due dates, final dates, and the like). The hours are preferably executed by any of the dates (generally other than reminder dates) assigned to a task, preferably the earlier the better, though they may alternatively be allocated to each date assigned to a task. Tasks may be divided (but maintained together at a higher group level) and different persons, dates, and/or hours assigned to each divided or related task.

It is understood that the present invention may take many forms and embodiments. Accordingly, several variations may be made in the foregoing without departing from the spirit or the scope of the invention. For example, tasks with imminent deadlines may be tentatively scheduled for work and completion as soon as possible, the number of hours between completion and deadlines calculated, and that number of hours allocated to past due and priority tasks, though such method would have a drawback of not allocating hours as judiciously as the present invention. Hours for past due and priority tasks may be scheduled using iteration techniques rather than the foregoing determinative approach. Tasks that do not have a deadline or priority may be scheduled randomly in available time (e.g., 2006 in FIG. 20). The present invention could be used in the aggregate wherein free hours may be combined to determine the number of hours that a group of users may have available to work on a task.

It is further understood that, in further variations, the steps of FIG. 1, and portions, combinations, and permutations thereof, may be implemented together and/or independently of the others. For example, at least portions of steps 104, 106, and 118 may stand by themselves; at least portions of steps 104, 110, and 118 may stand by themselves; and at least portions of steps 104, 106, 110, 112, 114(1) and 118 may stand by themselves.

Time may be managed in increments other than hours and days, such as minutes and hours, minutes and days, and the like. Appointments, such as meetings, seminars, and the like, may be managed and scheduled by assigning a start date (or time) equal to the beginning of the appointment, and an end date (or time) equal to the end of the appointment, in which case, typically, the start date and end date would be the same.

Various values used in the program may be replaced with variables that a user could control as desired, such as the 10,000 value of steps 826 and 1414, the dates of steps 902, 924, 1102, 1124, and the like, and the values of 180 and 0.97 used in calculating the flex factor.

Figure 17:
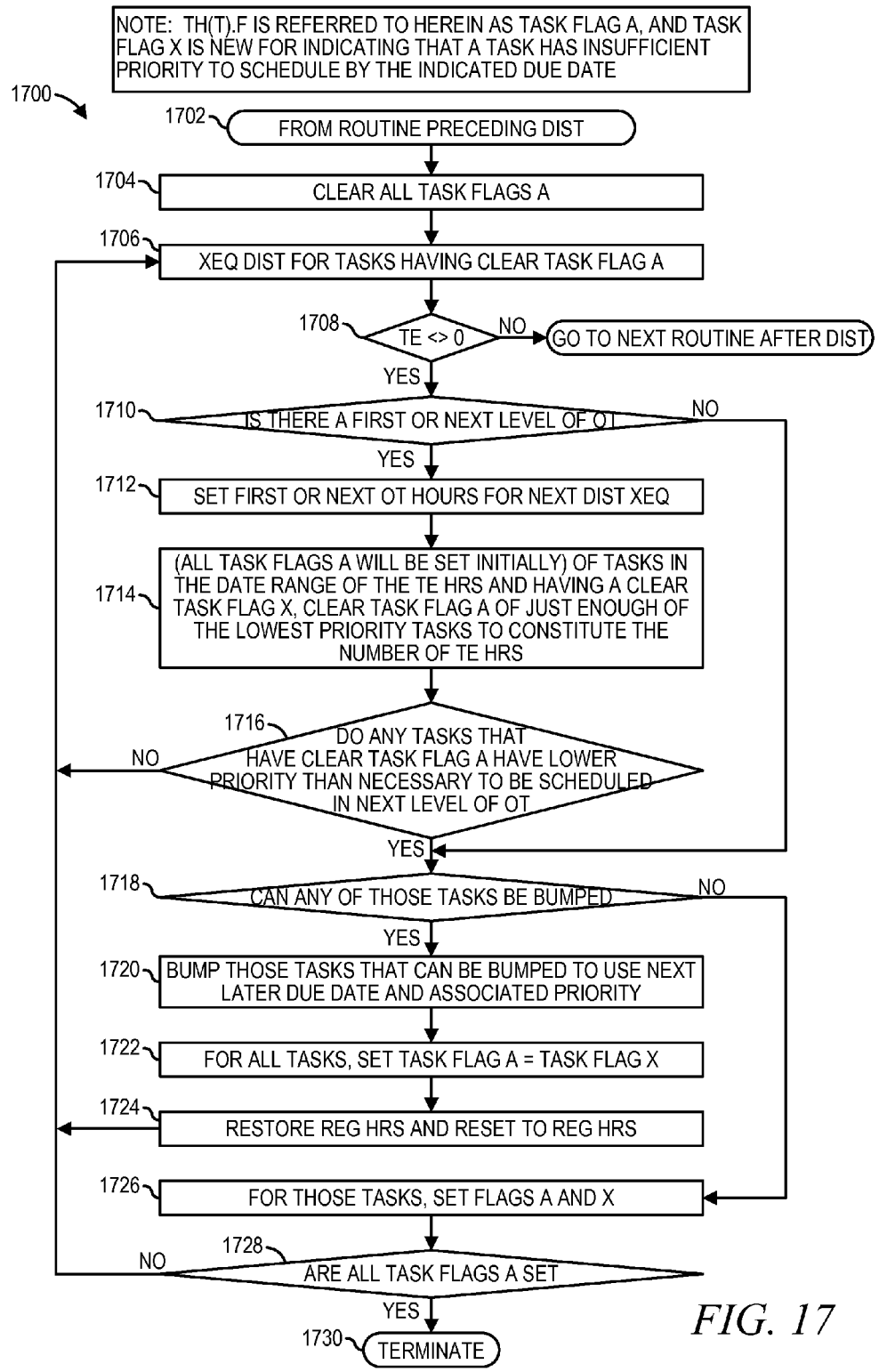
FIG. 17 depicts a high-level flow chart illustrating control logic embodying features of a preferred embodiment of the present invention for accounting for priorities assigned to tasks when scheduling such tasks.

As exemplified in FIG. 17, a range of priorities may be assigned to due dates, and priorities may be adjusted and taken into account on a daily basis. For example, if two due dates for a task have different priorities, then a priority may be assigned to each day therebetween based on a linear interpolation, a non-linear interpolation, a stepped interpolation, or a constant priority value may be assigned to all days in between based on the lower priority of the two dates. In another example, if 100 tasks are to be managed, and if it is determined when hours are being distributed that, after the 50th task, there are not enough hours available to schedule the 50th task, then the priority of the due dates of the first 50 tasks could me examined, and the tasks with the lowest priority due dates could be bumped to the next due date (which would presumably generally also have a higher priority). The hours could then be distributed again based on the new due dates, and if there are further shortages (e.g., at the 60th task) then lower priority due dates could be bumped again, and the cycle repeated until hours for all task may be distributed, or until all due dates have top priority and can not be bumped any further. In other words, if distributed hours indicate that there are not enough hours to meet all deadlines, then due dates of tasks that have resulted in the current shortage of hours may be examined to determine which have the lowest priorities, and those having the lowest priorities may be bumped to next due dates until there is no shortage of hours. As brought out by FIG. 17, OT may be assigned different priorities, so that OT is not assigned unless a task has a certain minimum priority. It is noted that by having priorities varying on a daily basis, "soft" due dates may be utilized, to thereby facilitate continuously increasing priorities based on a progressive continuum of time.

Tasks may be designated to have start dates automatically calculated dynamically based upon the completion of another task, either by the same person or another person.

When distributed hours are calculated, daily hours (e.g., OT) may be modeled as unlimited to facilitate a determination of how many hours would be needed to be worked at a minimum, and so that a determination may be made as to whether additional manpower is needed or deadlines need to be adjusted.

A time-keeping module may be adapted for use with the present invention to enable a user to not only keep his or her, but also so that time completed on a task may be entered and time required to complete a task may be updated and/or adjusted.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system comprising:
   a processor; and
   a memory device operably coupled to the processor, the memory device being configured for storing:
   a first list of one or more pending tasks, each of the one or more pending tasks being allocated a respective number of pending hours to be worked by a respective one of one or more pending due dates;
   a second list of one or more non-pending tasks, each of the one or more non-pending tasks being allocated a respective number of non-pending hours to be worked;
   a predetermined number of regular hours per day are available to work on the one or more pending tasks and the one or more non-pending tasks; and
   program code which, when executed by the processor, causes the processor to perform steps of:
   calculating a number of primary hours per day as the number of pending hours that must be scheduled per day to complete the respective one or more pending tasks by the respective one or more pending due dates such that primary hours are distributed as evenly as possible across as many days as possible;
   determining for each respective day whether the regular hours per day exceeds the primary hours per day;
   determining for each respective day a number of overtime hours per day as zero hours per day and a number of secondary hours per day as the regular hours per day less the primary hours per day, when the regular hours per day exceeds the primary hours per day;
   determining for each respective day a number of secondary hours per day as zero hours per day and a number of overtime hours per day as the primary hours per day less the regular hours per day, when the regular hours per day do not exceed the primary hours per day;
   determining for each of the one or more non-pending tasks a respective quasi due date by which the respective non-pending hours may be worked, the respective quasi due date being equal to the respective date when each of the one or more non-pending tasks would be completed if all of the respective non-pending hours were scheduled to be worked during the secondary hours per day; and
   scheduling the one or more pending tasks with the one or more non-pending tasks during the sum of the regular hours per day and the overtime hours per day in chronological order based on the respective pending due date of each of the one or more pending tasks and on the respective quasi due date of each of the one or more non-pending tasks.

2. The system of claim 1 wherein the one or more non-pending tasks include past due tasks.

3. The system of claim 1 wherein the one or more non-pending tasks include prioritized tasks.

4. The system of claim 1 wherein the one or more non-pending tasks include random tasks.

5. The system of claim 1 further comprising program code which, when executed by the processor, causes the processor to perform the step of generating a report indicating which of the one or more pending tasks and the one or more non-pending tasks should be worked each day as determined in the step of scheduling the one or more pending tasks and the one or more non-pending tasks.

6. The system of claim 1 wherein the respective quasi due date for each of the one or more non-pending tasks is equal to the date when each of the one or more non-pending tasks would be completed if all of the respective non-pending hours were scheduled to be worked as soon as possible during the secondary hours per day.

7. A system comprising:
   a processor; and
   a non-transitory computer readable medium embodying:
   a first list of one or more pending tasks, each of the one or more pending tasks being allocated a respective number of pending hours to be worked by a respective one of one or more pending due dates;

a second list of one or more non-pending tasks, each of the one or more non-pending tasks being allocated a respective number of non-pending hours to be worked, a predetermined number of regular hours per day that are available to work on the one or more pending tasks and the one or more non-pending tasks; and program code executable by the processor, the program code configuring the processor to:

calculate a number of primary hours per day as the number of pending hours that must be scheduled per day to complete the respective one or more pending tasks by the respective one or more pending due dates such that primary hours are distributed as evenly as possible across as many days as possible;

determine for each respective day whether the regular hours per day exceeds the primary hours per day;

determine for each respective day a number of overtime hours per day as zero hours per day and a number of secondary hours per day as the regular hours per day less the primary hours per day, when the regular hours per day exceeds the primary hours per day;

determine for each respective day a number of secondary hours per day as zero hours per day and a number of overtime hours per day as the primary hours per day less the regular hours per day, when the regular hours per day do not exceed the primary hours per day;

determine for each of the one or more non-pending tasks a respective quasi due date by which the respective non-pending hours may be worked, the respective quasi due date being equal to the respective date when each of the one or more non-pending tasks would be completed if all of the respective non-pending hours were scheduled to be worked during the secondary hours per day; and schedule the one or more pending tasks with the one or more non-pending tasks during the sum of the regular hours per day and the overtime hours per day in chronological order based on the respective pending due date of each of the one or more pending tasks and on the respective quasi due date of each of the one or more non-pending tasks.

8. The system of claim 7 wherein the program code further configures the processor to generate a report indicating which of the one or more pending tasks and the one or more non-pending tasks should be worked each day as determined by the program code configuring the processor to schedule the one or more pending tasks and the one or more non-pending tasks.

9. The system of claim 7 wherein the respective quasi due date for each of the one or more non-pending tasks is equal to the date when each of the one or more non-pending tasks would be completed if all of the respective non-pending hours were scheduled to be worked as soon as possible during the secondary hours per day.

10. The system of claim 7 wherein the one or more non-pending tasks include at least one past due task.

11. The system of claim 7 wherein the one or more non-pending tasks include at least one prioritized task.

12. The system of claim 7 wherein the one or more non-pending tasks include at least one random task.

13. A method for managing time, the method comprising steps performed by a computer processor executing program code for:

calculating, by the computer processor, a number of primary hours per day as a number of pending hours that must be scheduled per day to complete a respective one or more pending tasks by a respective one or more pending due dates such that primary hours are distributed as evenly as possible across as many days as possible, wherein each of the one or more pending tasks being allocated a respective number of pending hours to be worked by a respective one of one or more pending due dates;

determining, by the computer processor, for each respective day whether regular hours per day exceeds the primary hours per day, wherein a predetermined number of regular hours per day are available to work on the one or more pending tasks and the one or more non-pending tasks;

determining, by the computer processor, for each respective day a number of overtime hours per day as zero hours per day and a number of secondary hours per day as the regular hours per day less the primary hours per day, when the regular hours per day exceeds the primary hours per day;

determining, by the computer processor, for each respective day a number of secondary hours per day as zero hours per day and a number of overtime hours per day as the primary hours per day less the regular hours per day, when the regular hours per day do not exceed the primary hours per day;

determining, by the computer processor, for each of one or more non-pending tasks being allocated a respective number of second hours to be worked, a respective quasi due date by which the respective non-pending hours may be worked, the respective quasi due date being equal to the respective date when each of the one or more non-pending tasks would be completed if all of the respective non-pending hours were scheduled to be worked during the secondary hours per day; and scheduling, by the computer processor, the one or more pending tasks with the one or more non-pending tasks during the sum of the regular hours per day and the overtime hours per day in chronological order based on the respective pending due date of each of the one or more pending tasks and on the respective quasi due date of each of the one or more non-pending tasks.

14. The method of claim 13 wherein the one or more non-pending tasks include one or more past due tasks.

15. The method of claim 13 wherein the one or more non-pending tasks include one or more prioritized tasks.

16. The method of claim 13 wherein the one or more non-pending tasks include one or more random tasks.

17. The method of claim 13 further comprising a step performed by a computer processor executing program code for generating a report indicating which of the one or more pending tasks and the one or more non-pending tasks should be worked each day as determined in the step performed by a computer processor executing program code for scheduling the one or more pending tasks and the one or more non-pending tasks.

18. The method of claim 13 wherein the respective quasi due date for each of the one or more non-pending tasks is equal to the date when each of the one or more non-pending tasks would be completed if all of the respective non-pending hours were scheduled to be worked as soon as possible during the secondary hours per day.

* * * * *